(12) United States Patent
Bull et al.

(10) Patent No.: US 8,617,474 B2
(45) Date of Patent: Dec. 31, 2013

(54) SYSTEMS UTILIZING NON-ZEOLITIC METAL-CONTAINING MOLECULAR SIEVES HAVING THE CHA CRYSTAL STRUCTURE

(75) Inventors: Ivor Bull, Hopewell Junction, NY (US); Gerald Stephen Koermer, Basking Ridge, NJ (US); Ahmad Moini, Princeton, NJ (US); Signe Unverricht, Jersey City, NJ (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 13/214,445

(22) Filed: Aug. 22, 2011

(65) Prior Publication Data

US 2011/0300028 A1 Dec. 8, 2011

Related U.S. Application Data

(62) Division of application No. 12/361,980, filed on Jan. 29, 2009, now abandoned.

(60) Provisional application No. 61/024,946, filed on Jan. 31, 2008.

(51) Int. Cl.
*B01D 50/00* (2006.01)
*B01J 37/30* (2006.01)

(52) U.S. Cl.
USPC ........... 422/171; 422/172; 422/180; 502/214; 502/11

(58) Field of Classification Search
USPC ................ 422/171, 172, 180; 502/11, 214
See application file for complete search history.

(56) References Cited

U.S. PATENT DOCUMENTS

| | | | |
|---|---|---|---|
| 3,346,328 A | 10/1967 | Sergeys et al. |
| 4,220,632 A | 9/1980 | Pence et al. |
| 4,297,328 A | 10/1981 | Ritcher et al. |
| 4,440,871 A | 4/1984 | Lok et al. |
| 4,544,538 A | 10/1985 | Zones |
| 4,567,029 A | 1/1986 | Wilson et al. |
| 4,735,927 A | 4/1988 | Gerdes et al. |
| 4,735,930 A | 4/1988 | Gerdes et al. |
| 4,861,743 A | 8/1989 | Flank et al. |
| 4,867,954 A | 9/1989 | Staniulis et al. |
| 4,874,590 A | 10/1989 | Staniulis et al. |
| 4,961,917 A | 10/1990 | Byrne |
| 5,024,981 A | 6/1991 | Speronello et al. |
| 5,041,270 A | 8/1991 | Fujitani et al. |
| 5,096,684 A | 3/1992 | Guth et al. |
| 5,233,117 A | 8/1993 | Barger |
| 5,313,792 A | 5/1994 | Katoh et al. |
| 5,417,949 A | 5/1995 | McWilliams et al. |
| 5,477,014 A | 12/1995 | Dunne et al. |
| 5,516,497 A | 5/1996 | Speronello et al. |
| 5,589,147 A | 12/1996 | Farnos et al. |
| 5,589,149 A | 12/1996 | Garland et al. |
| 5,733,837 A | 3/1998 | Nakatsuji et al. |
| 5,884,473 A | 3/1999 | Noda et al. |
| 6,139,808 A | 10/2000 | Mizuno et al. |
| 6,162,415 A | 12/2000 | Liu et al. |
| 6,171,556 B1 | 1/2001 | Burk et al. |
| 6,316,683 B1 | 11/2001 | Janssen et al. |
| 6,319,487 B1 | 11/2001 | Liu et al. |
| 6,350,298 B1 | 2/2002 | Su et al. |
| 6,376,562 B1 | 4/2002 | Ihm et al. |
| 6,395,674 B1 | 5/2002 | Fung et al. |
| 6,503,863 B2 | 1/2003 | Fung et al. |
| 6,569,394 B2 | 5/2003 | Fischer et al. |
| 6,576,203 B2 | 6/2003 | Abe et al. |
| 6,606,856 B1 | 8/2003 | Brown et al. |
| 6,685,905 B2 | 2/2004 | Mertens et al. |
| 6,696,032 B2 | 2/2004 | Mertens et al. |
| 6,709,644 B2 | 3/2004 | Zones et al. |
| 6,974,889 B1 | 12/2005 | Verduijn et al. |
| 7,014,827 B2 | 3/2006 | Mertens et al. |
| 7,049,261 B2 | 5/2006 | Nam et al. |
| 7,094,389 B2 | 8/2006 | Cao et al. |
| 7,182,927 B2 | 2/2007 | Tran et al. |
| 7,229,597 B2 | 6/2007 | Patchett et al. |
| 7,601,662 B2 | 10/2009 | Bull et al. |
| 2001/0038812 A1 | 11/2001 | Yavuz et al. |
| 2001/0043896 A1 | 11/2001 | Domesle et al. |
| 2002/0016252 A1 | 2/2002 | Takahashi et al. |
| 2002/0084223 A1 | 7/2002 | Feimer et al. |
| 2003/0069449 A1 | 4/2003 | Zones et al. |
| 2004/0082466 A1 | 4/2004 | Cao et al. |
| 2004/0098973 A1 | 5/2004 | Tennison et al. |
| 2004/0166035 A1 | 8/2004 | Noda et al. |

(Continued)

FOREIGN PATENT DOCUMENTS

DE 394541 A1 6/1990
DE 3941541 6/1990

(Continued)

OTHER PUBLICATIONS

Final Office Action in U.S. Appl. No. 12/970,582, dated Mar. 26, 2012, 13 pgs.
Non-Final Office Action in U.S. Appl. No. 12/970,545, dated Mar. 20, 3012, 14 pgs.
"Final Office Action in U.S. Appl. No. 12/480,360, dated Jul. 18, 2012", 10 pgs.
"Brief on Appeal-Requester", Control No. 95/001,453 Jun. 14, 2012 , 48 pgs.
"Declaration (G) By Alexander Green, Ph.D., Under 37 C.F.R. § 1.132", Control No. 95/001,453 Sep. 12, 2012 , 8 pgs.
2009 DOE SMM Review, 2009, 1-22.
Chinese Journal of Catalysis, *Thermal and Hydrothermal Stability of SAPO-34 Molecular Sieve*, vol. 17, No. 6 Nov. 1996, 9 pgs.

(Continued)

*Primary Examiner* — Elizabeth Wood
(74) *Attorney, Agent, or Firm* — Melanie L. Brown

(57) ABSTRACT

Systems for treating exhaust gas incorporating catalysts comprising metal-loaded non-zeolitic molecular sieves having the CHA crystal structure, including Cu-SAPO-34, and methods for preparing such catalysts are disclosed. The catalysts can be used to remove nitrogen oxides from a gaseous medium across a broad temperature range and exhibit hydrothermal stability at high reaction temperatures.

14 Claims, 8 Drawing Sheets

(56) References Cited

U.S. PATENT DOCUMENTS

| | | | |
|---|---|---|---|
| 2004/0171476 | A1 | 9/2004 | Nam et al. |
| 2004/0209760 | A1 | 10/2004 | Yoshikawa |
| 2005/0031514 | A1 | 2/2005 | Patchett et al. |
| 2005/0096214 | A1 | 5/2005 | Janssen et al. |
| 2006/0018806 | A1 | 1/2006 | Ziebarth et al. |
| 2006/0039843 | A1 | 2/2006 | Patchett et al. |
| 2006/0115403 | A1 | 6/2006 | Yuen |
| 2006/0228283 | A1 | 10/2006 | Malyala et al. |
| 2007/0000243 | A1 | 1/2007 | Liu et al. |
| 2007/0043249 | A1 | 2/2007 | Cao et al. |
| 2007/0149385 | A1 | 6/2007 | Liu et al. |
| 2007/0286798 | A1 | 12/2007 | Cao et al. |
| 2008/0241060 | A1 | 10/2008 | Li et al. |
| 2008/0317999 | A1 | 12/2008 | Patchett et al. |
| 2009/0048095 | A1 | 2/2009 | Li et al. |
| 2009/0057199 | A1 | 3/2009 | Ziebarth et al. |
| 2009/0060809 | A1 | 3/2009 | Shioya et al. |
| 2009/0196812 | A1 | 8/2009 | Bull et al. |
| 2010/0092362 | A1 | 4/2010 | Li et al. |
| 2010/0290963 | A1 | 11/2010 | Andersen et al. |
| 2011/0165052 | A1 | 7/2011 | Beutel et al. |
| 2011/0182791 | A1 | 7/2011 | Fedeyko et al. |
| 2011/0200505 | A1 | 8/2011 | Cavataio et al. |

FOREIGN PATENT DOCUMENTS

| | | |
|---|---|---|
| DE | 10059520 | 5/2001 |
| EP | 0396085 | 11/1990 |
| EP | 0396085 A2 | 11/1990 |
| EP | 0624393 A1 | 11/1994 |
| EP | 0773057 A1 | 5/1997 |
| EP | 0950800 A2 | 10/1999 |
| EP | 1837489 A1 | 9/2007 |
| JP | 6-48725 | 2/1994 |
| JP | 05-057194 | 9/1994 |
| WO | WO-99/56859 | 11/1999 |
| WO | WO-03/035549 A1 | 5/2003 |
| WO | WO-2007/004774 A1 | 1/2007 |
| WO | WO-2007/005308 A2 | 1/2007 |
| WO | WO-2008/019585 A1 | 2/2008 |
| WO | WO-2008/118434 A1 | 10/2008 |
| WO | WO-2008/132452 A2 | 11/2008 |

OTHER PUBLICATIONS

Final Office Action in U.S. Appl. No. 12/280,360, dated Jul. 26, 2010, 11 pgs.
Final Office Action in U.S. Appl. No. 12/480,360, dated Jul. 26, 2010, 11 pgs.
Final Office Action in U.S. Appl. No. 12/480,360, mailed Jul. 26, 2010, 11 pgs.
Final Office Action in U.S. Appl. No. 12/612,142, mailed Jun. 10, 2011, 21 pgs.
Final Office Action in U.S. Appl. No. 12/612,142, mailed Jun. 20, 2011, 21 pgs.
Fourth International Congress on Catalysis and Automotive Pollution Control, Apr. 1997, 7.
Gabriele Centi Declaration of Sep. 22, 2010, 11 pgs.
Machine Translation of DE 3941541 A1, Jun. 28, 1990, 8 pgs.
Non-Final Office Action in U.S. Appl. No. 12/038,423 mailed Jan. 13, 2009, 16 pgs.
Non-Final Office Action in U.S. Appl. No. 12/361,980, mailed Mar. 23, 2011, 24 pgs.
Non-Final Office Action in U.S. Appl. No. 12/361,980, mailed Sep. 22, 2010, 26 pgs.
Non-Final Office Action in U.S. Appl. No. 12/480,360, dated Feb. 26, 2010, 19 pgs.
Non-Final Office Action in U.S. Appl. No. 12/612,142, mailed Dec. 29, 2010, 26 pgs.
Non-Final Office Action, dated Feb. 26, 2010 in U.S. Appl. No. 12/480,360, 19 pgs.
PCT International Search Report and Written Opinion in PCT/US2009/032610, Jul. 16, 2009, 20 pgs.
Request for Inter Partes Reexamination, dated Sep. 28, 2010, 77 pgs.
U.S. Appl. No. 10/634,659, filed Aug. 5, 2003.
USPTO Non-Final Office Action mailed Jan. 13, 2009 for U.S. Appl. No. 12/038,423, filed Feb. 27, 2008, 1-9.
Akolekar, Deepak B. et al., "FTIR investigations of the adsorption and disproportionation of NO on Cu-exchanged silicoaluminophosphate of type 34", *J. Chem. Soc., Faraday Trans.*, 94(1) 1998, 155-160.
Amiridis, Michael D. et al., "Selective catalytic reduction of nitric oxide by hydrocarbons", *Applied Catalysis* 1996, 203-227 pgs.
Ashtekar, Sunil et al., "Small-Pore Molecular Sieves SAPO-34 and SAPO-44 with Chabazite Structure: A Study of Silicon Incorporation", *J. Phys. Chem.* 1994, 98 1994, 4877-4883.
Baerlocher, CH. et al., "Atlas of Zeolite Framework Types", *Elsevier—Fifth Revised Edition* 2001, 5 pages.
Barger, Paul T. et al., "Hydrothermal Stability of SAPO-34 in the Methanol-to-Olefins Process", *Tha Arabian Journal for Science and Engineering*, vol. 21, No. 2 Apr. 1996, 10.
Barthomeuf, Denise , "Journal: NATO ASI Series, Series C: Mathematical and Physical Sciences Issue 444", *Generation of acidity (amount and strength) in siliconaluminophosphates (SAPO zeolites), Examples of SAPO-5* ; pp. 375-390 1994, 17 pgs.
Brandenberger, Sandro et al., "The State of the Art in Selective Catalytic Reduction of NOx by Ammonia Using Metal-Exchanged Zeolite Catalysts", *Catalysis Reviews 50:4* 2008, 41 pgs.
Breck, Donald W. , "Zeolite Molecular Sieves", *John Wiley & Sons, A Wiley-Intescience Publication* 1974, 7 pgs.
Cavataio, Giovanni et al., "Cu/Zeolite SCR on High Porosity Filters: Laboratory and Engine Performance Evaluations", *SAE International, Ford Motor Company* 2009, 10 pgs.
Cavataio, Giovanni et al., "Development of Emission Transfer Functions for Predicting the Deterioration of a Cu-Zeolite SCR Catalyst", *SAE International, Ford Motor Company* 2009, 1-17.
Cavataio, Giovanni et al., "Enhanced Durability of a Cu/Zeolite Based SCR Catalyst", *SAE Int. J. Fuels Lubr*, vol. 1, Issue 1 2008, 477-487.
Cavataio, Giovanni et al., "Laboratory Testing of Urea-SCR Formulations to Meet Tier 2 Bin 5 Emissions", *SAE International, 2007 World Congress* 2007, 16 pgs.
Centi, Gabriele et al., "Nature of active species in copper-based catalysts and their chemistry of transformation of nitrogen oxides", *Applied Catalysis A: General 132* 1995, 179-259.
Centi, G. et al., "Role of the Nature of Copper Sites in the Activity of Copper-Based Catalysts for NO Conversion", *Research on Chemical Intermediates, 17* 1992, 125-135 pgs.
Chen, Jiesheng et al., "Silicoaluminophosphate number eighteen (SAPO-18): a new mircoporous solid acid catalyst", *Catalysis Letters 28* 1994, 241-248.
Cheng, Yisun et al., "Sulfur Tolerance and DeSOx Studies on Diesel SCR Catalysts", *SAE Int. J. Fuels Lubr.*, vol. 1, Issue 1 2008, 471-476.
Cheng, Yisun et al., "The Effects of SO2 and SO3 Poisoning on Cu/Zeolite SCR Catalysts", *SAE International* 2009, 7 pgs.
Chung, Sung Y. et al., "Effect of Si/Alratio of Mordenite and ZSM-5 type Zeolite Catalysts on Hydrothermal Stability for NO Reduction by Hydrocarbons", *Studies in Surface Science Catalysis*, vol. 130 2000, 1511-1516.
Dedecek, Jiri et al., "Effect of Framework Charge Density on Catalytic Activity of Copper Loaded Molecular Sieves of Chabazite Structure in Nitrogen (II) Oxide Decomposition", *Collect. Czech. Chem. Commun.* (vol. 65) 2000, 343-351 pgs.
Dedecek, J. et al., "Siting of the Cu+ ions in dehydrated ion exchanged synthetic and natural chabasites: a Cu+ photoluminescence study", *Microporous and Mesoporous Materials 32* 1999, 13 pgs.
Fickel, Dustin W. et al., "Copper Coordination in Cu-SSZ-13 and Cu-SSZ-16 Investigated by Variable-Temperature XRD", *J. Phys. Chem C, 114* 2010, 1633-1640.
Fickel, Dustin W. , "Investigating the High-Temperature Chemistry of Zeolites: Dehydrogenation of Zeolites and NH3-SCR of Copper of Exchanged Small-Pore Zeolites", *Dissertation* 2010, 1-199.

(56) References Cited

OTHER PUBLICATIONS

Frache, A. et al., "Catalytic DeNOx activity of cobalt and copper ions in microporous MeALPO-34 and MeAPSO-34", *Catalysis Today* 75 2002, 359-365.
Frache, A. et al., "CuAPSO-34 catalysts for N2O decomposition in the presence of H2O. A study of zeolite structure stability in comparison to Cu-SAPO-34 and Cu-ZSM-5", *Topics in Catalysis* vol. 22 Nos. 1/2 2003, 5 pgs.
Frache, A. et al., "Spectroscopic characterisation of microporous alum inophosphate materials with potential application in environmental catalysis", *Catalysis Today* 77 2003, 371-384.
Frache, A. et al., "Synthesis, Spectroscopic and Catalytic Properties of Cobalt and Copper Ions in Aluminophosphates with Chabasite-Like Structure, Studies of the NO Reactivity", *Studies in Surface Science and Catalysis* 140 2001, 269-277.
Girard, James et al., "Influence of Hydrocarbon Storage on the Durabiluty of SCR Catalysts", *SAE International 2008 World Congress* 2008, 10 pgs.
Hartmann, Martin et al., "Transition-Metal Ions in Aluminophosphate and Silicoaluminophosphate Molecular Sieves: Location, Interaction with Adsorbates and Catalytic Properties", *Chem. Rev.* 99 (3) 1999, 635-663.
Heck, Ronald M. et al., "Catalytic Air Pollution Control", *A John Wiley & Sons, Inc., Publication—Wiley-Interscience* 2002 , 4 pgs.
Ishihara, Tatsumi et al., "Copper Ion Exchanged Silicoaluminophosphate (SAPO) as a Thermostable Catalyst for Selective Reduction of NOx with Hydrocarbons", *Studies in Surface Science and Catalysis*, vol. 84 (1994), 1493-1500.
Ishihara, Tatsumi et al., "Copper Ion-Exchanged SAPO-34 as a Thermostable Catalyst for Selective Reduction of NO with C3H6", *Journal of Catalysis 169* (1997) , 93-102.
Ishihara, Tatsumi et al., "Copper Ion-Exchanged SAPO-34 as a Thermostable Catalyst for Selective Reduction of NO with C3H6", *Journal of Catalysis 169,* Article No. CA971681 1997, 93-102.
Ishihara, Tatsumi et al., "Selective Reduction of Nitrogen Monoxide with Propene over Cu-Silico-aluminophosphate (SAPO) under Oxidizing Atmosphere", *The Chemical Society of Japan* (1992), 2119-2122.
Ishihara, Tatsumi et al., "Thermostable Molecular Sieves, Silicoaluminophosphate (SAPO)-34, for the Removal of NOx with C3H6 in the Coexistence of O2, H2O, and SO2", *Ind. Eng. Chem. Res.* 1997, 36 1997, 17-22.
Kim, Moon H. et al., "Water Tolerance of DeNOx SCR Catalysts Using Hydrocarbons: Findings, Improvements and Challenges", *Korean J. Chem. Eng.* 18(5) 2001 , 725-740.
Kim, Moon H. et al., "Water Tolerance of DeNOx SCR Catalysts Using Hydrocarbons: Findings, Improvements and Challenges", *Korean J. Chem. Eng.* 18(5) 2001, 725-740 pgs.
Kwak, Ja H. et al., "Excellent activity and selectivity of Cu-SSZ-13 in the selective catalytic reduction of NOx with NH3", *Journal of Catalysis* 2010, 4 pgs.
Li, Yuejin et al., "Selective NH3 Oxidation to N2 in a Wet Stream", *Applied Catalysis B: Environment* 13 1997, 131-139.
Lok, B. M. et al., "Silicoaluminophosphate Molecular Sieves: Another New Class of Microporous Crystalline Inorganic Solids", *Journal of the American Chemical Society*, vol. 106 1984, 6092-6093.
Long, R. Q. et al., "Selective Catalytic Oxidation (SCO) of Ammonia to Nitrogen over Fe-Exchanged Zeolites", *Journal of Catalysis 201* 2001, 145-152.
Marchese, L. et al., "ALPO-34 and SAPO-34 synthesized by using morpholine as templating agent. FTIR and FT-Raman studies of the host-guest and guest-guest interactions within the zeolitic framework", *Microporous and Mesoporous Materials 30* 1999, 145-153.
Medros, F. G. et al., "Dual-Catalyst System to Broaden the Window of Operability in the Reduction of NOx with Ammonia", *Ind. Eng. Chem. Res.* 28 1989, 1171-1177.

Miller, William R. et al., "Urea selective catalytic reduction", *2010 Factiva, Inc.* 2000, 9 pgs.
Misono, Makoto, "Catalytic reduction of nitrogen oxides by bifunctional catalysts", *Baltzer Science Publishers* vol. 2, No. 2 Dec. 1998, 22 pgs.
Palella, B I. et al., "On the hydrothermal stability of CuAPSO-34 microporous catalysts for N2O decomposition: a comparison with CuZSM-5", *Journal of Catalysis 217* (2003), 100-106.
Pelella, B. I. et al., "Enhancement of Hydrothermal Stability of Cu-ZSM5 Catalyst for NO Decomposition", *Kinetics and Catalysis*, vol. 47, No. 5 2006, 728-736.
Pluth, J. J. et al., "Positions of Cations and Molecules in Zeolites with the Chabazite Framework. IV Hydrated and Dehydrated Cu2+-Exchanged Chabazite", *Mat. Res. Bull.*, vol. 12 1977, 1001-1007.
Prakash, A M. et al., "Synthesis of SAPO-34: High Silicon Incorporation in the Presence of Morpholine as Template", *J. Chem. Soc. Faraday Trans.* 1994, 90(15) 1994, 2291-2296.
Qi, Gongshin et al., "Selective Catalytic Reduction of Nitric Oxide with Ammonia over ZSM-5 Based Catalysts for Diesel Engine Applications", *Catal Lett 121* 2008, 111-117.
Rahkamaa-Tolonen, Katariina et al., "The effect of NO2 on the activity of fresh and aged zeolite catalysts in the NH3-SCR reaction", *Catalysts Today*, 100 2005, 217-222.
Rebrov, E. V. et al., "Development of the Kinetic Model of Platinum Catalyzed Ammonia Oxidation in a Microreactor", *Chemical Engineering Journal 90* 2002, 61-76.
Torre-Abreu, C. et al., "Selective Catalytic Reduction of NO on Copper-Exchanged Zeolites: The Role of The Structure of the Zeolite in the Nature of Copper-Active Sites", *Catalysis Today 54* 1999, 407-418.
Treacy, M.M. J. et al., "Proceedings of the 12th International Zeolite Conference", *Materials Research Society Conference Proceedings IV* Jul. 5-10, 1998, 6.
Uzunova, Ellie L. et al., "Adsorption of NO on Cu-SAPO-34 and Co-SAPO-34; A Periodic DFT Study", *J. Phys. Chem C 2008*, 2632-2639.
Watanabe, Yosh Ih Ide et al., "Multinuclear NMR Studies on the Thermal Stability of SAPO-34", *Journal of Catalysis* 1993, 430-436 pgs.
Xu, Lifeng et al., "Impact of a Cu-zeolite SCR Catalyst on the Performance of a Diesel LNT+SCR System", *SAE International 2009*, 12 pgs.
Zelenka, P. et al., "Exhaust gas aftetreatment systems for diesel engines with respect to future emission legislation", *Diesel Engine Technology 96* May 1993, 13 pgs.
Non-Final Office Action in U.S. Appl. No. 12/480,360, mailed Feb. 1, 2012, 20 pgs.
Action Closing Prosecution in U.S. Appl. No. 95/001,453, mailed May 11, 2012, 69 pgs.
Non-Final Office Action in U.S. Appl. No. 13/214,391, dated Oct. 26, 2012, 37 pgs.
Action Closing Prosecution in U.S. Appl. No. 95/001,453, mailed Nov. 18, 2011, 102 pgs.
Non-Final Office Action in U.S. Appl. No. 12/970,545, mailed Dec. 5, 2011, 21 pgs.
Non-Final Office Action in U.S. Appl. No. 12/970,582, mailed Dec. 7, 2011, 25 pgs.
Third Party Comments After Patent Owner's Response After ACP Under 37 CFR 1.951, dated Jan. 18, 2012, 40 pgs.
Halasz, J. et al., "Selective Reduction of NO Over Copper-Containing Modified Zeolites", *Studies in Surface Science and Catalysis*, vol. 96 1995, 675-685.
Heck, Ronald M. et al., "Catalytic Air Pollution Control—Commercial Technology", *Second Edition* 2002, 9 pgs.
Korhonen, Satu T. et al., "Isolated $Cu^{2+}$ ions: active sites for selective catalytic reduction of NO+", *ChemComm* Nov. 15, 2010, 3 pgs.
McEwen, Jean-Sabin et al., "Selective Catalytic Reduction of NOx by ammonia on metal-exchanged zeolite catalysts", *Prepr. Pap-Am. Chem. Soc., Div. Fuel Chem.*, 55 2011, 1 pgs.
Final Office Action in U.S. Appl. No. 13/214,391, mailed May 2, 2013, 15 pgs.

US 8,617,474 B2

SYSTEMS UTILIZING NON-ZEOLITIC METAL-CONTAINING MOLECULAR SIEVES HAVING THE CHA CRYSTAL STRUCTURE

CROSS-REFERENCE TO RELATED APPLICATIONS

This application is a divisional of U.S. patent application Ser. No. 12/361,980, filed on Jan. 29, 2009, which claims priority to Provisional application 61/024,946, filed on Jan. 31, 2008, the content of both of which is hereby incorporated by reference in their entirety.

TECHNICAL FIELD

Embodiments of the invention relate to catalysts comprising non-zeolitic metal containing molecular sieves that have the CHA framework or crystal structure, methods for their manufacture and use, and exhaust gas treatment systems containing such catalysts.

BACKGROUND ART

Several technologies are available for the reduction of nitrogen oxides (NOx) from the exhaust of automobile engines. Three Way Catalysts (TWC) are designed to remove NOx from the exhaust of vehicles equipped with a gasoline engine. On the three-way catalyst, the nitrogen oxides react with the unburned hydrocarbons or CO in such a way that the oxygen of NOx is consumed for the oxidation of the unburned hydrocarbons or CO yielding nitrogen, carbon dioxide and water. Three-way catalysts cannot be used for the treatment of exhaust from lean burn and diesel engines because of the low NOx conversion in the presence of oxygen.

For diesel engines, there are two types of technologies for the reduction of NOx. The first is NOx storage and reduction, which requires alternating lean and rich operating periods of the engine. During the lean period, the nitrogen oxides will be adsorbed in the form of nitrates. During a rich period of operation, the nitrates are reduced to nitrogen by reaction with the hydrocarbons contained in the exhaust.

A second type of technology for the reduction of NOx in diesel engines involves Selective Catalytic Reduction (SCR) of NOx. A first type of SCR involves hydrocarbon SCR (HC SCR), which involves the use of a hydrocarbon such as diesel fuel as a reducing agent to reduce NOx in the diesel engine exhaust gas stream. However, the applicability of HC SCR for diesel engines does not appear to be viable because most of catalysts suitable for HC-SCR show a very narrow temperature window where a useful NOx reduction can be obtained. See, for example, Ishihara et al., Ind. Eng. Chem. *Res., Vol.* 36, No. 1, 1997, in which conversion of NOx using Cu-SAPO-34 and hydrocarbons was observed to be less than 70% at about 400° C. and less than about 20% at 200° C.

A second type of SCR involves ammonia SCR. Selective Catalytic Reduction, using ammonia or ammonia precursor as reducing agent is believed to be the most viable technique for the removal of nitrogen oxides from the exhaust of diesel vehicles. In typical exhaust, the nitrogen oxides are mainly composed of NO (>90%), so the SCR catalyst favors the conversion of NO and $NH_3$ into nitrogen and water. Two major challenges in developing catalysts for the automotive application of the ammonia SCR process are to provide a wide operating window for SCR activity, including low temperatures of from 200° C. and higher and improvement of the catalyst's hydrothermal stability for temperatures above 500° C. As used herein hydrothermal stability refers to retention of a material's capability to catalyze the SCR of NOx, with a preference for the retention to be at least 85% of the material's NOx conversion ability prior to hydrothermal aging.

The emissions from vehicles are measured using standardized engine or vehicle test cycles, in which speed and load are varied to simulate actual driving conditions. The ECE test cycle, which is also referred to as UDC, represents urban driving under low speed and load, and the Extra Urban Driving Cycle (EUDC) involves higher speeds. Most test cycles include a cold-start portion. For example, the Euro 3 test cycle includes the ECE+EUDC cycles, and includes evaluation of emissions when the catalyst at temperatures as low as 150° C. for a significant portion of the drive cycle. Thus, low temperature NOx conversion is of great interest.

Zeolites are aluminosilicate crystalline materials having rather uniform pore sizes which, depending upon the type of zeolite and the type and amount of cations included in the zeolite lattice, typically range from about 3 to 10 Angstroms in diameter. Both synthetic and natural zeolites and their use in promoting certain reactions, including the selective reduction of nitrogen oxides with ammonia in the presence of oxygen, are well known in the art.

Metal-promoted zeolite catalysts including, among others, iron-promoted and copper-promoted zeolite catalysts, where, for instance, the metal is introduced via ion-exchange, for the selective catalytic reduction of nitrogen oxides with ammonia are known. Iron-promoted zeolite beta has been an effective catalyst for the selective reduction of nitrogen oxides with ammonia. Unfortunately, it has been found that under harsh hydrothermal conditions, such as reduction of NOx from gas exhaust at temperatures exceeding 500° C., the activity of many metal-promoted zeolites, such as Cu and Fe versions of ZSM-5 and Beta, begins to decline. This decline in activity is believed to be due to destabilization of the zeolite such as by dealumination and consequent loss of metal-containing catalytic sites within the zeolite.

To maintain the overall activity of NOx reduction, increased levels of the washcoat loading of the iron-promoted zeolite catalyst must be provided. As the levels of the zeolite catalyst are increased to provide adequate NOx removal, there is an obvious reduction in the cost efficiency of the process for NOx removal as the costs of the catalyst rise.

Due to the considerations discussed above, there is a desire to prepare materials which offer improved low temperature SCR activity and/or improved hydrothermal durability over existing zeolitic materials, for example, catalyst materials which are stable at temperatures up to at least about 650° C. and higher, for example in the range of about 700° C. to about 800° C. and up to about 900° C. Moreover, since diesel engines operate under transient conditions, there is a desire to provide materials that exhibit high performance over a wide temperature range, from as low as 200° C. up to about 450° C. See Klingstedt et al., "Improved Catalytic Low-Temperature NOx Removal," ACCOUNTS OF CHEMICAL RESEARCH/VOL. 39, NO. 4, 2006. Thus, while existing technologies provide high temperature performance, there is a need for materials can offer low temperature performance in predominantly NO feeds combined with hydrothermal stability. Low temperature performance is important for cold start and low engine load conditions.

SUMMARY

Aspects of the invention are directed to a metal-loaded non-zeolitic molecular sieve having the CHA structure and effective to selectively reduce nitrogen oxides with ammonia in the presence of oxygen, methods for the manufacture of such catalysts, catalyst composites comprising such molecular sieves, and exhaust gas treatment systems and methods incorporating such catalysts. The catalyst may be part of an exhaust gas treatment system used to treat exhaust gas streams, especially those emanating from gasoline or diesel engines.

One embodiment of the present invention pertains to metal-loaded non-zeolitic molecular sieves having the CHA structure and their application in exhaust gas systems such as those designed to reduce nitrogen oxides. In specific embodiments, novel metal-loaded non-zeolitic molecular sieve catalysts having the CHA structure are provided which exhibit improved $NH_3$ SCR of NOx. The non-zeolitic molecular sieve catalysts made in accordance with one or more embodiments of the present invention provide a catalyst material which exhibits excellent hydrothermal stability and high catalytic ability over a wide temperature range. When compared with other zeolitic catalysts that find application in this field, such as Fe Beta zeolites, non-zeolitic molecular sieve catalysts materials according to embodiments of the present invention offer improved low temperature activity and hydrothermal stability.

According to a first embodiment, a comprises a Cu-loaded non-zeolitic molecular sieve having the CHA crystal structure having a Cu loading so that the catalyst is effective to selectively reduce nitrogen oxides with ammonia in the presence of oxygen in an exhaust gas stream at 200° C. when the catalyst has been deposited on a honeycomb substrate having a cell density of 400 cpsi at a loading between 2 and 2.5 g/in$^3$ and tested at a space velocity of 80,000 hr$^{-1}$ where the feed stream comprises a mixture of 10% $O_2$, 5% $H_2O$, 500 ppm NO and 500 ppm $NH_3$ to provide at least 80% NOx conversion. To be clear, the first embodiment is directed to a catalyst exhibiting excellent NOx conversion at 200° C., and it is not limited by a particular loading. The recitation of "when the catalyst has been deposited on a honeycomb substrate having a cell density of 400 cpsi at a loading between 2 and 2.5 g/in$^3$ and tested at a space velocity of 80,000 hr$^{-1}$ where the feed stream comprises a mixture of 10% $O_2$, 5% $H_2O$, 500 ppm NO and 500 ppm $NH_3$" in the claims is provided as testing parameters to provide clarity when a non-zeolitic molecular sieve having the CHA crystal structure has a copper loading that results in at least 80% conversion at 200° C. In a second embodiment, the non-zeolitic molecular sieve comprises Cu-SAPO-34 and the catalyst is effective to provide at least about 85% NOx conversion in the exhaust gas stream at 200° C. In a third embodiment, the catalyst is effective to provide at least about 90% NOx conversion in the exhaust gas stream at 200° C.

In a fourth embodiment, the Cu-SAPO-34 material, upon hydrothermal aging in 10% steam at 850° C. and 6 hours, retains at least 85% on a percentage basis of the NOx conversion at 200° C. In a fifth embodiment, the Cu-SAPO-34 material, upon hydrothermal aging in 10% steam at 900° C. and 1 hour, retains at least 90% of the NOx conversion on a percentage basis at 200° C. In a sixth embodiment, the Cu-SAPO-34 material, upon hydrothermal aging in 10% steam at 900° C. and 1 hour, retains at least 95% of the NOx conversion on a percentage basis at 200° C.

In a seventh embodiment, the catalyst is effective to reduce NOx so that that ratio of NOx to $N_2O$ in the gas stream after passing through the catalyst is greater than 2.5. In an eighth embodiment, the catalyst is effective to reduce NOx so that that ratio of NOx to $N_2O$ in the gas stream after passing through the catalyst is greater than 5.

In a ninth embodiment, the catalyst is effective to make less than 10 ppm $N_2O$ over the temperature range of 200° C. to 450° C. In a tenth embodiment, the catalyst is effective to make less than 5 ppm $N_2O$ over the temperature range of 200° C. to 450° C.

In any of the embodiments 1-10 described above, one or more of the following features may further limit any of the embodiments above: the catalyst contains a secondary metal; b) the secondary metal comprises zirconium; the catalyst contains in the range of about 2 weight percent and 4 weight percent Cu.

Another aspect of the invention pertains to a process for manufacturing Cu-SAPO-34. In an eleventh embodiment, a process for manufacturing Cu-SAPO-34 comprises mixing a neutral, nitrogen-containing organic template, an alumina source, a silica source and a phosphorous source in a gel mixture; heating the gel to less than about 200° C. for at least about 12 hours to form crystalline SAPO-34; filtering and washing the crystalline SAPO-34; calcining the crystalline SAPO-34; and ion exchanging the crystalline SAPO-34 with a copper salt to provide Cu-SAPO-34.

The eleventh embodiment may include one or more of the following process variants: the template comprises morpholine and the heating temperature is less than about 185° C. and the heating time is at least about 24 hours; the copper salt comprises copper acetate; after ion exchanging the crystalline SAPO-34 with a copper salt to provide Cu-SAPO-34, Cu-SAPO-34 is washed to provide a filtrate having a conductivity less than about 600 $\mu Scm^{-1}$, or less than about 400 $\mu Scm^{-1}$, or less than about 200 $\mu Scm^{-1}$; calcining the washed Cu-SAPO-34 material at a temperature less than about 600° C.; and/or the crystalline material has a crystal size having 90% of the crystals less than 20 microns, or less than 15 microns In a twelfth embodiment a catalyst is provided made by the process for manufacturing described in the eleventh embodiment and the variants described above.

Another aspect of the invention pertains to a catalyst composite including a catalyst of any of embodiments 1-11 above. In a thirteenth embodiment, a catalyst composite comprises a honeycomb substrate having a catalyst of any of embodiments 1-10 and 12 deposited on a honeycomb substrate as a washcoat at a loading in the range of about 0.5 g/in$^3$ and 3.5 g/in$^3$. The honeycomb can be a wall flow substrate or a flow through substrate. In a fourteenth embodiment, in which the honeycomb substrate is a flow through substrate, at least a portion of the flow through substrate is coated with a washcoat containing Pt and a metal-loaded non-zeolitic molecular sieve to oxidize ammonia in the exhaust gas stream. In a sixteenth embodiment, at least a portion of a wall flow substrate is coated with a washcoat containing Pt and a metal-loaded non-zeolitic molecular sieve to oxidize ammonia in the exhaust gas stream.

Another aspect of the invention pertains to an exhaust gas treatment system. In a seventeenth embodiment, an exhaust gas treatment system includes a catalyst of embodiments 1-10, or 12-16 and a second catalyst such as an oxidation catalyst.

In an eighteenth embodiment, the catalyst of any of claims 1-10 is combined with a metal containing zeolitic SCR catalyst.

Another aspect of the invention pertains to process for the reduction of oxides of nitrogen contained in a gas stream in the presence of oxygen comprising contacting the gas stream with a Cu-loaded non-zeolitic molecular sieve as described in any of the previously described embodiments 1-10 or 12-17.

DETAILED DESCRIPTION

Figure 1A:
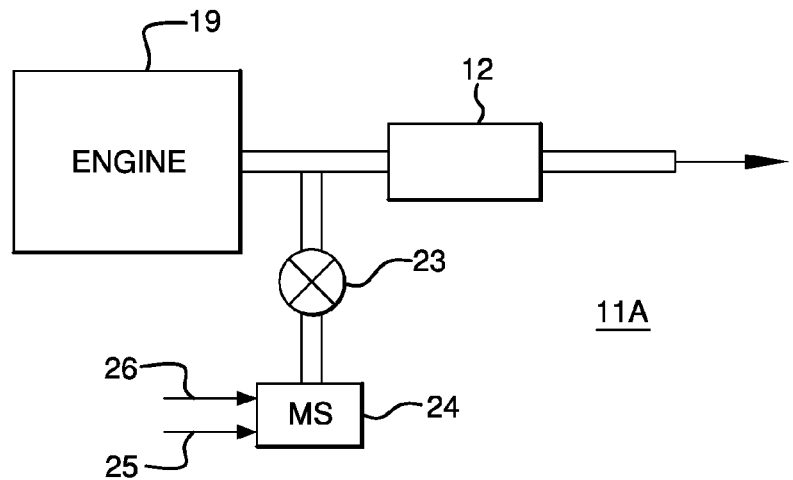
FIGS. 1A, 1B, and 1C are schematic depictions of three exemplary embodiments of the emissions treatment system of the invention.

Before describing several exemplary embodiments of the invention, it is to be understood that the invention is not limited to the details of construction or process steps set forth in the following description. The invention is capable of other embodiments and of being practiced or being carried out in various ways.

In one embodiment of the invention, metal-loaded, non-zeolitic molecular sieves having the CHA structure are provided. As used herein, the terminology "non zeolitic molecular sieve" refers to corner sharing tetrahedral frameworks where at least a portion of the tetrahedral sites are occupied by an element other than silicon or aluminum. As used herein, "fresh" refers to an as manufactured catalyst that has not been hydrothermally aged. Any non-aluminosilicate composition having the CHA framework structure (as defined by the International Zeolite Association) comprising at least one T element which is not Si or Al and exhibits improved $NH_3$ SCR or NOx can be utilized according to embodiments of the present invention. Non-limiting examples of such molecular sieves include aluminophosphates and metal-aluminophosphates, wherein metal could include silicon, copper, zinc or other suitable metals. Specific non-limiting examples include SAPO-34, SAPO-44, and SAPO-47. Especially suitable materials are those which couple excellent hydrothermal stability indicated by minimal loss of activity upon aging with improved catalytic activity compared to Fe-beta zeolite catalyst materials. Materials according to embodiments of the invention exhibit high catalytic NOx conversion performance and over a wide temperature range and low $N_2O$ make. More specifically, Cu-SAPO-34 materials exhibit high NOx conversion for fresh and aged samples under extreme temperature conditions and at high space velocities of 80,000 $h^{-1}$. It will be appreciated that when comparing NOx conversion values between materials, a higher space velocity subjects the material to a more demanding test for NOx conversion. In other words, samples tested at higher space velocities will result in a lower NOx conversion value than a sample tested under the same conditions but at a lower space velocity.

In specific embodiments, the wide temperature range includes low temperature, for example, temperatures as low as 200° C. In more specific embodiments, Cu-SAPO-34 materials are provided that exhibit at least about 75%, more specifically, at least about 80%, still more specifically at least about 85%, and in highly specific embodiments at least about 90% NOx conversion when fresh and hydrothermally aged in 10% steam for at least 1 hour, 3 hours and 6 hours at temperatures of at least about 800° C., at least about 850° C., and at least about 900° C. To avoid any doubt, materials in accordance with embodiments of the invention exhibit the NOx conversions noted above when hydrothermally aged in 10% steam for up to at least 3 hours and up to 6 hours at each of 800° C. and 850° C. In one or more embodiments materials that have been hydrothermally aged in 10% steam at 900° C. for 1 hour exhibit NOx conversions of at least 80%, 85% and 90%. In other specific embodiments, the fresh and hydrothermally aged NOx conversion of Cu-SAPO-34 materials exhibit better NOx conversion than Cu CHA zeolitic molecular sieves (e.g. Cu SSZ-13) for both fresh and hydrothermally aged materials aged and tested under similar conditions. In one or more embodiments, the NOx conversion performance of Cu-SAPO-34 materials provided herein exhibit at least about 5% (e.g., 85% versus 80%), 10% (e.g. 90% versus 80%), 15% (e.g. 95% versus 80%) or 20% (e.g. 100% versus 80%) percentage points better conversion than CuCHA zeolitic molecular sieves (e.g. Cu SSZ-13) under similar conditions. In one or more embodiments, Cu-SAPO-34 materials are provided that exhibit extremely low $N_2O$ make for fresh and hydrothermally aged samples over a temperature range of 200° C. to 450° C. In specific embodiments, the $N_2O$ make over the temperature range of 200° C. to 450° C. is less than about 10 ppm, less than 9 ppm, less than about 8 ppm, less than 7 ppm, less than about 5 ppm, less than about 4 ppm, less than about 3 ppm, and less than about 2 ppm.

NOx conversion for Cu-SAPO-34 as defined herein is measured under the following procedures and conditions. A Cu-SAPO34 slurry is prepared by mixing 90 g of Cu-SAPO34, as described in detail below, with 215 mL of deionized water. The mixture is ball-milled for 11 hours to obtain a slurry which comprises 90% particles smaller than 10 μm. 15.8 g of zirconyl acetate in dilute acetic acid (containing 30% $ZrO_2$) is added into the slurry with agitation. The slurry is coated onto 1" Diameter×3" Long (1" D×3" L) cellular ceramic cores, having a cell density of 400 cpsi (cells per square inch) and a wall thickness of 6.5 mil. The coated cores are dried at 110° C. for 3 hours and calcined at 400° C. for 1 hour. The coating process is repeated at least once to obtain a target washcoat loading of 2.4 $g/in^3$. This provides a sample similar to catalytic articles that are used in automobiles.

Nitrogen oxides selective catalytic reduction (SCR) efficiency and selectivity of a fresh (as made) catalyst core are measured by adding a feed gas mixture of 500 ppm of NO, 500 ppm of $NH_3$, 10% $O_2$, 5% $H_2O$, balanced with $N_2$ to a steady state reactor containing a 1"D×3"L catalyst core. For the catalytic test, the washcoated core is shaped into a square cross section wrapped with a ceramic insulation mat and placed inside an Inconel reactor tube heated by an electrical furnace. The gases, $O_2$ (from air), $N_2$ and $H_2O$ are preheated in a preheater furnace before entering the reactor. The reactive gases NO and $NH_3$ are introduced between the preheater furnace and the reactor. The catalyst is coated on the aforementioned 400 cpsi (cells per square inch) core to target a loading between 2 and 2.5 $g/in^3$. The reaction is carried at a space velocity of 80,000 $hr^{-1}$ across a 150° C. to 460° C. temperature range (space velocity as determined at 32° F.). Space velocity is defined as the gas flow rate comprising the entire reaction mixture divided by the geometric volume of the catalyst core. These conditions define the standard test for fresh catalysts.

Hydrothermal stability of the catalyst is measured by hydrothermal aging of a fresh catalyst core in the presence of 10% $H_2O$ (remainder air; space velocity at 32° F. $h^{-1}$ 4000 $h^{-1}$) one of the following conditions, 750° C. for 25 hours, 800° C. for 50 hours, 850° C. for 6 and 10 hours and 900° C. for 1 hour followed by measurement of the nitrogen oxides SCR efficiency and selectivity by the same process, as outlined above, for the SCR evaluation on a fresh catalyst core.

In one or more embodiments, Cu-SAPO34 materials are provided herein having a $SiO_2$ content in the range of about 10 to 25 wt. %, more specifically in the range of about 12 to 20 wt. % and most specifically in the range of about 15 to 19 wt. %, as measured by X-ray fluorescence (XRF). In one or embodiments, the fresh SAPO-34 or Cu-SAPO-34 materials have a BET surface area in the range of about 300 to 600 $m^2/g$, preferably greater than 350 $m^2/g$, in the range of 375 $m^2/g$ to 600 $m^2/g$. In one or more embodiments, the Cu-SAPO34 materials, after ion exchange, have a conductivity sufficiently low, for example less than 600 $\mu Scm^{-1}$, more specifically, less than 400 $\mu Scm^{-1}$, and less than about 200 $\mu Scm^{-1}$, so that conductivity the solution or filtrate containing the crystalline material that is substantially free of non-exchanged metal. The conductivity of the filtrate can be measured by a conductivity meter (Newport Electronics, Model DP-03, Santa Anna, Calif.). In one or more embodiments, the Cu content of the Cu-SAPO34 materials on a CuO basis as measured by Inductively Coupled Plasma (ICP) analysis is in the range of about 1% to 5%, more specifically in the range of about 2% to about 4%, and even more specifically in the range of about 2.5% to about 3.5%.

[In accordance with another aspect of the invention, methods of manufacturing or synthesing Cu-SAPO-34 materials are provided. In one embodiment, a neutral, nitrogen-containing organic template (e.g., morpholine), suitable alumina, silica and phosphorous source materials are mixed together to form a gel mixture. Thereafter, the gel is heated to temperature of less than about 200° C., more specifically, less than about 185° C. and in highly specific embodiments, less than about 175° C. The heating at a suitable temperature, for example about 170° C. is performed for at least about 12 hours, at least about 24 hours, or at least about 48 hours. The mixture is then cooled, filtered and washed. Thereafter, ion exchange is performed sing a suitable copper salt, such as copper sulfate, copper nitrate or copper acetate. After ion exchange crystalline material is washed until the conductivity of the filtrate is sufficiently low. Thereafter, the material is calcined at a temperature less than about 650° C., specifically less than 600° C., and more preferably less than 550° C. In one or more embodiments, the crystalline material made by the method has a crystal size having 90% of the crystals less than about 20 microns, and in specific embodiments, 90% of the crystals are less than about 15 microns. More details of the process of synthesizing Cu-SAPO-34 materials are provided in the Examples. In accordance with one or more embodiments, Cu-SAPO-34 catalysts materials are provided that are made by the methods of manufacturing described above.

As used herein according to one or more embodiments, "loaded" refers to the extra framework occupation of metals within the porous network of the molecular sieve. The extra framework species resides in the channels, cavities, cages and/or the exterior surfaces of the molecular sieves. Metals could be in one of several forms, including, but not limited to, ions, oxides, and oxycations. In one or more embodiments of the invention, the structural integrity of the zeolite or catalyst is enhanced by the presence of the metal in the molecular sieve. In one or more embodiments, a second metal further improves the catalytic properties of a catalytic article including a Cu-SAPO-34 molecular sieve. An example of such a second metal includes zirconium, which may improve washcoat properties such as adhesion or porosity, and may improve the NOx conversion activity of the Cu-SAPO-34 material and resistance to degradation by hydrothermal aging.

As will be appreciated by the skilled artisan, a wide variety of material parameters, including, but not limited to silicon content, the particular metal loaded, the metal loading quantity, the oxidation state of the metal, crystal size, surface area, overall composition of the non zeolitic molecular sieve, structural defects and others, may be independent or interdependent in their effect on hydrothermal stability and NOx conversion performance. Accordingly, in order to obtain an SCR catalyst material that exhibits excellent fresh and aged NOx conversion performance, it will be appreciated that changing one parameter such as the metal loading, crystal size and/or surface area may improve NOx conversion performance, but may negatively impact other material properties. Furthermore, a wide variety of processing parameters to manufacture the non-zeolitic molecular sieve material, including but not limited to the hydrothermal synthesis conditions such as temperature, time, pH, specific reactants and material properties of the specific reactants can have an impact on the fresh and/or aged NOx conversion performance of the final material. Furthermore, in addition to the numerous process conditions that must be considered to obtain a non zeolitic molecular sieve acceptable for use as an SCR catalyst for NOx abatement, little detail has been provided in the literature on the specifics of loading the metal (e.g., Cu, Fe, or Co) to the molecular sieve material. In this regard, the particular metal salt, the pH of the loading conditions during ion exchange, and direct incorporation of the metal to the molecular sieve during hydrothermal synthesis of the molecular sieve (e.g., single step synthesis versus multistep synthesis) provides yet another set of variables to consider in the manufacture of a metal loaded molecular sieve for use as an SCR catalyst for the abatement of nitrogen oxides. Obtaining an excellent material for SCR performance is not a straightforward endeavor.

Metal-loaded non-zeolitic molecular sieve catalysts having the CHA structure in accordance with one or more embodiments of the invention can be utilized in catalytic processes which involve oxidizing and/or hydrothermal conditions, for example, in temperatures in excess of about 600° C., for example, above about 800° C. and in the presence of up to about 10% water vapor. More specifically, it has been found that metal-loaded non-zeolitic molecular sieve catalysts having the CHA structure which have been prepared in accordance with embodiments of the invention have increased hydrothermal stability compared to Fe Beta zeolites. Metal-loaded non-zeolitic molecular sieve catalysts having the CHA structure prepared in accordance with embodiments of the invention yield improved activity in the selective catalytic reduction of NOx with ammonia, especially when operated under high temperatures of at least about 600° C., for example, about 800° C. and higher, and high water vapor environments of up to about 10% or more.

Embodiments of this invention also pertain to a process for abatement of $NO_x$ in an exhaust gas stream generated by an internal combustion engine utilizing metal-loaded non-zeolitic molecular sieve catalysts having the CHA structure. Other embodiments pertain to SCR catalysts comprising metal-loaded non-zeolitic molecular sieves having the CHA structure, and exhaust gas treatment systems incorporating metal-loaded non-zeolitic molecular sieves having the CHA structure. Still other embodiments pertain to ammonia oxidation (AMOX) catalysts and exhaust gas treatment systems incorporating AMOX catalyst comprising metal-loaded non-zeolitic molecular sieve catalysts having the CHA structure. According to one or more embodiments, catalysts and systems utilize metal-loaded non-zeolitic molecular sieves having the CHA structure having ion-exchanged metal which do not exhibit significant hydrothermal degradation of the catalysts when aged under high temperatures of at least about 600° C., for example, about 800° C. and higher, and high water vapor environments of about 10% or more. As used herein, no significant hydrothermal degradation of the catalyst material is exhibited by retaining at least about 85% of the fresh NOx conversion, retaining at least about 90% of the fresh NOx conversion and at least about 95% of the fresh NOx conversion when hydrothermally aged for temperatures of at least about 800° C. and 850° C. for times of 6 and 10 hours using the testing conditions described above, and 900° C. for 1 hour for the testing conditions described above. As used herein, "retention of NOx conversion" (or "retains NOx conversion" or "retaining NOx conversion") on a percentage basis after aging means the percentage NOx conversion of an aged sample divided by the percentage NOx conversion of a fresh sample. The retention of NOx conversion occurs at temperatures in the range of 200° C. to 450° C.

According to one or more embodiments, the metal-loaded non-zeolitic molecular sieves having the CHA structure operate within a low temperature window. Over time, in an exhaust gas treatment system having a DOC pre-catalyst downstream from the engine followed by an SCR catalyst and a CSF, or a DOC pre-catalyst upstream from a CSF and SCR, the DOC will tend to activate for both low temperature light-off and HC fuel burning. In such systems, it is beneficial if the SCR catalyst can maintain its ability to operate at low temperatures. Since the oxidation catalysts will lose their ability to oxidize NO to $NO_2$, it is useful to provide an SCR catalyst that can treat NO as effectively as $NO_2$. Metal-loaded non-zeolitic molecular sieves having the CHA structure produced in accordance with embodiments of the invention have the ability to reduce NO with $NH_3$ at low temperatures Another feature of the catalysts according to one or more embodiments of the present invention, is that they can achieve a high conversion of NOx to nitrogen by ammonia SCR that is independent of NOx speciation, i.e. the $NO:NO_2$ ratio. It is well known in the art that $NO_2$ is more reactive than NO and that the presence of $NO_2$ in an ammonia SCR catalyst feed stream improves NOx conversion. The optimal $NO:NO_2$ ratio for many catalysts is about 1:1.

Achieving this ratio in the exhaust feed stream can be problematic because NO is the primary NOx species formed from high temperature combustion and the NO to $NO_2$ conversion is slow in the absence of a catalyst. As a result, the SCR catalyst is often positioned downstream of the diesel oxidation catalyst (DOC) which contains elements that can convert NO to $NO_2$. However the DOC catalyst can deactivate with time and, in any case, the ratio of $NO:NO_2$ exiting the DOC catalyst is hard to control and may not be optimal.

Therefore, the catalysts according to one or more embodiments of the present invention provide additional flexibility for treating the pollutants from a diesel engine exhaust stream.

According to embodiments of the invention, the SCR catalyst can be in the form of self supporting catalyst particles or as a honeycomb monolith formed of the SCR catalyst composition. In one or more embodiments of the invention however, the SCR catalyst composition is disposed as a washcoat or as a combination of washcoats on a ceramic or metallic substrate, for example, a honeycomb flow through substrate.

In a specific embodiment of an emissions treatment system the SCR catalyst is formed from a metal-loaded non-zeolitic molecular sieves having the CHA structure.

When the catalyst according to the present invention is deposited on the honeycomb monolith substrates to provide a catalyst composite, such SCR catalyst compositions are deposited at a concentration of at least about 0.5 $g/in^3$, for example, about 1.3 $g/in^3$, about 2.4 $g/in^3$ or higher such as 5 $g/in^3$ to ensure that the desired NOx reduction is achieved and to secure adequate durability of the catalyst over extended use.

The term "SCR" catalyst is used herein in a broader sense to mean a selective catalytic reduction in which a catalyzed reaction of nitrogen oxides with a reductant occurs to reduce the nitrogen oxides. "Reductant" or "reducing agent" is also broadly used herein to mean any chemical or compound tending to reduce NOx at elevated temperatures. In specific embodiments, the reducing agent is ammonia, specifically an ammonia precursor, i.e., urea.

Substrates

In one or more embodiments, the catalyst compositions are disposed on a substrate. The substrate may be any of those materials typically used for preparing catalysts, and will usually comprise a ceramic or metal honeycomb structure. Any suitable substrate may be employed, such as a monolithic substrate of the type having fine, parallel gas flow passages extending therethrough from an inlet or an outlet face of the substrate, such that passages are open to fluid flow therethrough (referred to as honeycomb flow through substrates). The passages, which are essentially straight paths from their fluid inlet to their fluid outlet, are defined by walls on which the catalytic material is disposed as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 400 or more gas inlet openings (i.e., cells) per square inch of cross section.

The substrate can also be a wall-flow filter substrate, where the channels are alternately blocked, allowing a gaseous stream entering the channels from one direction (inlet direction), to flow through the channel walls and exit from the channels from the other direction (outlet direction). AMOX and/or SCR catalyst composition can be coated on the flow through or wall-flow filter. If a wall flow substrate is utilized, the resulting system will be able to remove particulate matter along with gaseous pollutants. The wall-flow filter substrate can be made from materials commonly known in the art, such as cordierite, aluminum titanate or silicon carbide. It will be understood that the loading of the catalytic composition on a wall flow substrate will depend on substrate properties such as porosity and wall thickness, and typically will be lower than loading on a flow through substrate.

The ceramic substrate may be made of any suitable refractory material, e.g., cordierite, cordierite-alumina, silicon nitride, zircon mullite, spodumene, alumina-silica magnesia, zircon silicate, sillimanite, a magnesium silicate, zircon, petalite, alpha-alumina, an aluminosilicate, and the like. Suitable substrates are cordierite substrates available from Corning, Inc. and aluminum titanate substrates available from NGK The substrates useful for the catalysts of embodiments of the present invention may also be metallic in nature and be composed of one or more metals or metal alloys. The metallic substrates may be employed in various shapes such as corrugated sheet or monolithic form. Suitable metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt. % of the alloy, e.g., 10-25 wt. % of chromium, 3-8 wt. % of aluminum and up to 20 wt. % of nickel. The alloys may also contain small or trace amounts of one or more other metals such as manganese, copper, vanadium, titanium, and the like. The surface or the metal substrates may be oxidized at high temperatures, e.g., 1000° C. and higher, to improve the resistance to corrosion of the alloys by forming an oxide layer on the surfaces of the substrates. Such high temperature-induced oxidation may enhance the adherence of the refractory metal oxide support and catalytically promoting metal components to the substrate.

In alternative embodiments, one or both of the metal-loaded non-zeolitic molecular sieves having the CHA structure compositions may be deposited on an open cell foam substrate. Such substrates are well known in the art, and are typically formed of refractory ceramic or metallic materials.

Washcoat Preparation

According to one or more embodiments, washcoats of metal-loaded non-zeolitic molecular sieves having the CHA structure can be prepared using a binder. According to one or more embodiments, use of a $ZrO_2$ binder derived from a suitable precursor such as zirconyl acetate or any other suitable zirconium precursor such as zirconyl nitrate. In one embodiment, zirconyl acetate binder provides a catalytic coating that remains homogeneous and intact after thermal aging, for example, when the catalyst is exposed to high temperatures of at least about 600° C., for example, about 800° C. and higher, and high water vapor environments of about 10% or more. Keeping the washcoat intact is beneficial because loose or free coating could plug the downstream CSF causing the backpressure to increase. Other potentially suitable binders include, but are not limited to, alumina and silica. Alumina binders include aluminum oxides, aluminum hydroxides, and aluminum oxyhydroxides. Aluminum salts and colloidal forms of alumina many also be used. Silica binders include various forms of $SiO_2$, including colloidal silica. Furthermore, binder compositions may include any combination of zirconia, alumina, and silica. According to one or more embodiments, metal-loaded non-zeolitic molecular sieves having the CHA structure can be used as an ammonia oxidation catalyst. Such AMOX catalysts are useful in exhaust gas treatment systems including an SCR catalyst. As discussed in commonly assigned U.S. Pat. No. 5,516,497, the entire content of which is incorporated herein by reference, a gaseous stream containing oxygen, nitrogen oxides and ammonia can be sequentially passed through first and second catalysts, the first catalyst favoring reduction of nitrogen oxides and the second catalyst favoring the oxidation or other decomposition of excess ammonia. As described in U.S. Pat. No. 5,516,497, the first catalysts can be a SCR catalyst comprising a zeolite and the second catalyst can be an AMOX catalyst comprising a molecular sieve.

As is known in the art, to reduce the emissions of nitrogen oxides from flue and exhaust gases, ammonia is added to the gaseous stream containing the nitrogen oxides and the gaseous stream is then contacted with a suitable catalyst at elevated temperatures in order to catalyze the reduction of nitrogen oxides with ammonia. Such gaseous streams, for example, the products of combustion of an internal combustion engine or of a gas-fueled or oil-fueled turbine engine, often inherently also contain substantial amounts of oxygen. A typical exhaust gas of a turbine engine contains from about 2 to 15 volume percent oxygen and from about 20 to 500 volume parts per million nitrogen oxides, the latter normally comprising a mixture of NO and $NO_2$. Usually, there is sufficient oxygen present in the gaseous stream to oxidize residual ammonia, even when an excess over the stoichiometric amount of ammonia required to reduce all the nitrogen oxides present is employed. However, in cases where a very large excess over the stoichiometric amount of ammonia is utilized, or wherein the gaseous stream to be treated is lacking or low in oxygen content, an oxygen-containing gas, usually air, may be introduced between the first catalyst zone and the second catalyst zone, in order to insure that adequate oxygen is present in the second catalyst zone for the oxidation of residual or excess ammonia.

Metal-promoted zeolites have been used to promote the reaction of ammonia with nitrogen oxides to form nitrogen and $H_2O$ selectively over the competing reaction of oxygen and ammonia. The catalyzed reaction of ammonia and nitrogen oxides is therefore sometimes referred to as the selective catalytic reduction ("SCR") of nitrogen oxides or, as sometimes herein, simply as the "SCR process". Theoretically, it would be desirable in the SCR process to provide ammonia in excess of the stoichiometric amount required to react completely with the nitrogen oxides present, both to favor driving the reaction to completion and to help overcome inadequate mixing of the ammonia in the gaseous stream. However, in practice, significant excess ammonia over such stoichiometric amount is normally not provided because the discharge of unreacted ammonia from the catalyst to the atmosphere would itself engender an air pollution problem. Such discharge of unreacted ammonia can occur even in cases where ammonia is present only in a stoichiometric or sub-stoichiometric amount, as a result of incomplete reaction and/or poor mixing of the ammonia in the gaseous stream, resulting in the formation therein of channels of high ammonia concentration. Such channeling is of particular concern when utilizing catalysts comprising monolithic honeycomb-type carriers comprising refractory bodies having a plurality of fine, parallel gas flow paths extending therethrough because, unlike the case of beds of particulate catalyst, there is no opportunity for gas mixing between channels.

According to embodiments of the present invention, metal-loaded non-zeolitic molecular sieves having the CHA structure can be formulated to favor either (1) the SCR process, i.e., the reduction of nitrogen oxides with ammonia to form nitrogen and $H_2O$, or (2) the oxidation of ammonia with oxygen to form nitrogen and $H_2O$. U.S. Pat. No. 5,516,497, teaches iron and copper loading levels on zeolites other than copper silicoaluminophosphate to obtain selectivity for an SCR reaction and selectivity of the catalyst for the oxidation of ammonia by oxygen at the expense of the SCR process, thereby improving ammonia removal. In accordance with embodiments of the invention, metal loading can be tailored to obtain selectivity for SCR reactions and oxidation of ammonia by oxygen and to provide exhaust gas treatment systems utilizing both types of catalyst.

The above principles are utilized by providing a staged or two-zone catalyst in which a first catalyst zone with metal-loaded non-zeolitic molecular sieves having the CHA structure, that promotes SCR followed by a second catalyst zone comprising a metal-loaded non-zeolitic molecular sieves having the CHA structure and/or a precious metal component that promotes oxidation of ammonia. The resultant catalyst composition thus has a first (upstream) zone which favors the reduction of nitrogen oxides with ammonia, and a second (downstream) zone which favors the oxidation of ammonia. In this way, when ammonia is present in excess of the stoichiometric amount, whether throughout the flow cross section of the gaseous stream being treated or in localized channels of high ammonia concentration, the oxidation of residual ammonia by oxygen is favored by the downstream or second catalyst zone. The quantity of ammonia in the gaseous stream discharged from the catalyst is thereby reduced or eliminated. The first zone and the second zones can be on a single catalyst substrate or as separate substrates.

According to one or more embodiments of the invention, metal-loaded non-zeolitic molecular sieves having the CHA structure SCR catalysts can be disposed on a wall-flow filter or catalyzed soot filter. Washcoats comprising metal-loaded non-zeolitic molecular sieves having the CHA structure can be coated on a porous filter to provide for soot combustion, SCR and AMOX functions.

In one or more embodiments of the present invention, the catalyst comprises a precious metal component, i.e., a platinum group metal component. For example, as noted above, AMOX catalysts typically include a platinum component. Suitable precious metal components include platinum, palladium, rhodium and mixtures thereof. The several components (for example, metal-loaded non-zeolitic molecular sieves having the CHA structure and precious metal component) of the catalyst material may be applied to the refractory carrier member, i.e., the substrate, as a mixture of two or more components or as individual components in sequential steps in a manner which will be readily apparent to those skilled in the art of catalyst manufacture. As described above and in the examples, a typical method of manufacturing a catalyst according to an embodiment of the present invention is to provide the catalyst material as a coating or layer of washcoat on the walls of the gas-flow passages of a suitable carrier member. This may be accomplished by impregnating a fine particulate refractory metal oxide support material, e.g., gamma alumina, with one or more catalytic metal components such as a precious metal, i.e., platinum group, compound or other noble metals or base metals, drying and calcining the impregnated support particles and forming an aqueous slurry of these particles. Particles of the bulk metal-loaded non-zeolitic molecular sieves having the CHA structure may be included in the slurry. Activated alumina may be thermally stabilized before the catalytic components are dispersed thereon, as is well known in the art, by impregnating it with, e.g., a solution of a soluble salt of barium, lanthanum, zirconium, rare earth metal or other suitable stabilizer precursor, and thereafter drying (e.g., at 110° C. for one hour) and calcining (e.g., at 550° C. for one hour) the impregnated activated alumina to form a stabilizing metal oxide dispersed onto the alumina. Base metal catalysts may optionally also have been impregnated into the activated alumina, for example, by impregnating a solution of a base metal nitrate into the alumina particles and calcining to provide a base metal oxide dispersed in the alumina particles.

The carrier may then be immersed into the slurry of impregnated activated alumina and excess slurry removed to provide a thin coating of the slurry on the walls of the gas-flow passages of the carrier. The coated carrier is then dried and calcined to provide an adherent coating of the catalytic component and, optionally, the metal-loaded non-zeolitic molecular sieves having the CHA structure material, to the walls of the passages thereof. One or more additional layers may be provided on the carrier. After each layer is applied, or after a number of desired layers are applied, the carrier is then dried and calcined to provide a finished catalyst member in accordance with one embodiment of the present invention.

Alternatively, the alumina or other support particles impregnated with the precious metal or base metal component may be mixed with bulk or supported particles of the metal-loaded non-zeolitic material having the CHA structure in an aqueous slurry, and this mixed slurry of catalytic component particles and metal-loaded non-zeolitic molecular sieves having the CHA structure material particles may be applied as a coating to the walls of the gas-flow passages of the carrier.

In use, the exhaust gas stream can be contacted with a catalyst prepared in accordance with embodiments of the present invention. For example, catalysts comprising metal-loaded non-zeolitic molecular sieves having the CHA structure made in accordance with embodiments of the present invention are well suited to treat the exhaust of engines, including diesel engines.

According to one or more embodiments, the metal-loaded non-zeolitic molecular sieves having the CHA structure can be used in combination with other metal containing zeolitic SCR catalysts such as Beta zeolite (e.g., Fe Beta), zeolite Y, and ZSM5. A metal-loaded non-zeolitic molecular sieve having the CHA structure can be physically mixed with a metal containing zeolitic SCR catalyst, or alternatively, they can be in separate washcoats. The separate washcoats containing different catalysts can be provided in a layered structure, or alternatively, the different catalysts can be arranged in an upstream/downstream relationship on a substrate. In another alternative, it may be desirable to place one type of catalyst on a first substrate and another type of catalyst on a second substrate separate from the first substrate. In an exemplary embodiment, a metal-loaded non-zeolitic molecular sieve combined with FeBeta may provide a catalyst in which FeBeta exhibits excellent high temperature performance, while the metal-loaded non-zeolitic molecular sieve exhibits excellent low temperature performance, providing a wide range of operation.

Figure 1B:
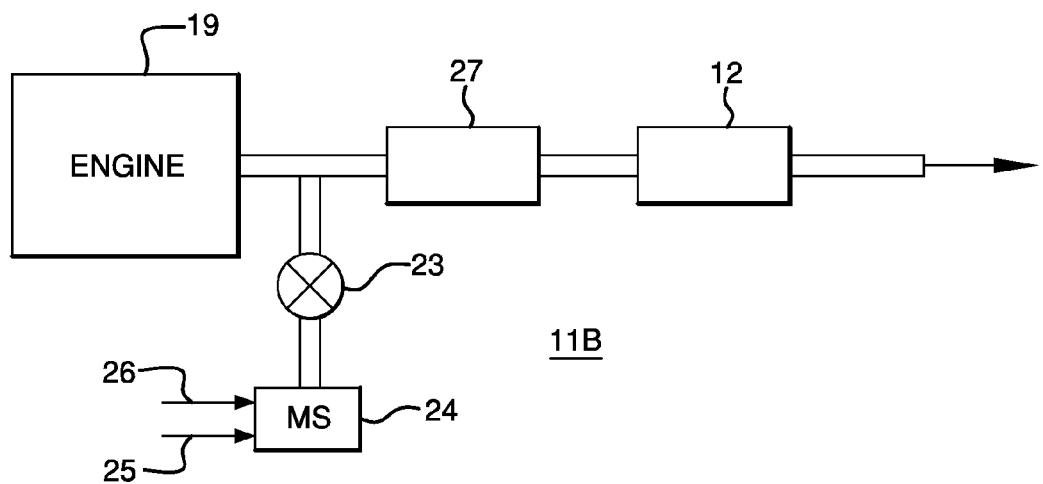
Figure 1C:
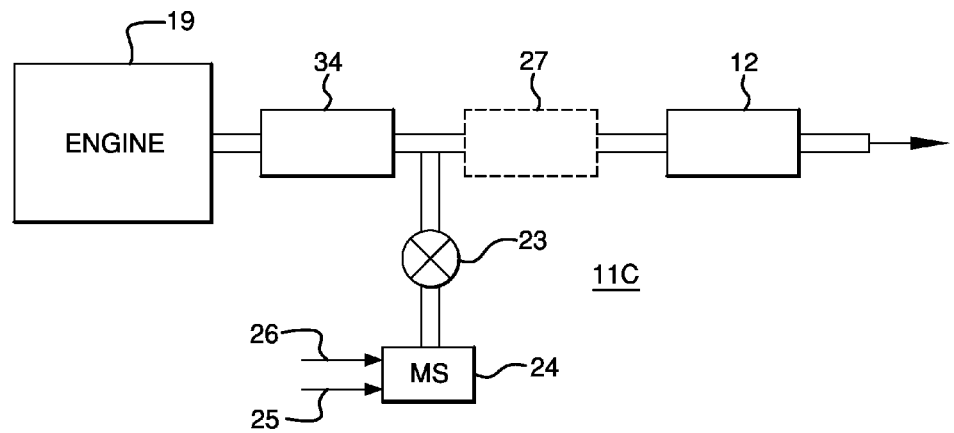

Exemplary embodiments of emission treatment systems are shown in FIGS. 1A, 1B and 1C. One embodiment of the inventive emissions treatment system denoted as 1A, is schematically depicted in FIG. 1A. The exhaust, containing gaseous pollutants (including unburned hydrocarbons, carbon monoxide and NOx) and particulate matter, is conveyed from the engine 19 to a position downstream in the exhaust system where a reductant, i.e., ammonia or an ammonia-precursor, is added to the exhaust stream. The reductant is injected as a spray via a nozzle (not shown) into the exhaust stream. Aqueous urea shown on one line 25 can serve as the ammonia precursor which can be mixed with air on another line 26 in a mixing station 24. Valve 23 can be used to meter precise amounts of aqueous urea which are converted in the exhaust stream to ammonia.

The exhaust stream with the added ammonia is conveyed to the SCR catalyst substrate 12 (also referred to herein including the claims as "the first substrate") containing metal-loaded non-zeolitic molecular sieves having the CHA structure in accordance with one or more embodiments. On passing through the first substrate 12, the NOx component of the exhaust stream is converted through the selective catalytic reduction of NOx with $NH_3$ to $N_2$ and $H_2O$. In addition, excess $NH_3$ that emerges from the inlet zone can be converted through oxidation by a downstream ammonia oxidation catalyst (not shown) also containing metal-loaded non-zeolitic molecular sieves having the CHA structure to convert the ammonia to $N_2$ and $H_2O$. The first substrate is typically a flow through monolith substrate.

An alternative embodiment of the emissions treatment system, denoted as 11B is depicted in FIG. 1B which contains a second substrate 27 interposed between the $NH_3$ injector and the first substrate 12. In this embodiment, the second substrate is coated with an SCR catalyst composition which may be the same composition as is used to coat the first substrate 12 or a different composition. An advantageous feature of this embodiment is that the SCR catalyst compositions that are used to coat the substrate can be selected to optimize NOx conversion for the operating conditions characteristic of that site along the exhaust system. For example, the second substrate can be coated with an SCR catalyst composition that is better suited for higher operating temperatures experienced in upstream segments of the exhaust system, while another SCR composition can be used to coat the first substrate (i.e., the inlet zone of the first substrate) that is better suited to cooler exhaust temperatures which are experienced in downstream segments of the exhaust system.

In the embodiment depicted in FIG. 1B, the second substrate 27 can either be a honeycomb flow through substrate, an open cell foam substrate or a honeycomb wall flow substrate. In configurations of this embodiment where the second substrate is a wall flow substrate or a high efficiency open cell foam filter, the system can remove greater than 80% of the particulate matter including the soot fraction and the SOF. An SCR-coated wall flow substrate and its utility in the reduction of NOx and particulate matter have been described, for instance, in co-pending U.S. Pat. No. 7,229,597, the disclosure of which is hereby incorporated by reference.

In some applications it may be advantageous to include an oxidation catalyst upstream of the site of ammonia/ammonia precursor injection. For instance, in the embodiment depicted in FIG. 1C an oxidation catalyst is disposed on a catalyst substrate 34. The emissions treatment system 11C is provided with the first substrate 12 and optionally includes a second substrate 27. In this embodiment, the exhaust stream is first conveyed to the catalyst substrate 34 where at least some of the gaseous hydrocarbons, CO and particulate matter are combusted to innocuous components. In addition, a significant fraction of the NO of the NOx component of the exhaust is converted to $NO_2$. Higher proportions of $NO_2$ in the NOx component facilitate the reduction of NOx to $N_2$ and $H_2O$ on the SCR catalyst(s) located downstream. It will be appreciated that, in the embodiment shown in FIG. 1C, the first substrate 12 could be a catalyzed soot filter, and the SCR catalyst could be disposed on the catalyzed soot filter. In an alternative embodiment, the second substrate 27 comprising an SCR catalyst may be located upstream from catalyst substrate 34.

Testing of catalyst samples to determine the SCR performance of catalysts and/or to compare the performance to other catalysts can be completed as follows. The catalyst samples are slurried and washcoated, as described below onto a monolithic core. The size of the core is trimmed to give a square of 144 cells (at 400 cpsi) by three inches in length. The sample is loaded into a tubular flow reactor and tested for catalytic activity. The flow rate is set so that the space velocity over the sample is approximately 80,000 h−1, which is defined by the geometric volume of the sample with respect to the total volume of gas flow. The testing consists of flowing a simulated diesel exhaust gas mixture over the catalyst and measuring the NOx and $NH_3$ conversions, as well as $N_2O$ make. The simulated gas mixture consisted of 10% $O_2$, 5% $H_2O$, 500 ppm NO and 500 ppm $NH_3$. The testing procedure equilibrates the catalyst at several steady state temperature points, and measures the resulting conversions. The steady state temperature points chosen for testing and comparison for the samples herein were 200° C., 250° C., 300° C. and 450° C. The high temperature stability is measured by treating the catalysts at temperatures of 850° C. for 6 h with a flow of air and steam (10 vol %). According to one or more embodiments, samples can be aged above 600° C., more particularly, above 700° C. for times longer than 6 hrs, and more particularly, for longer 24 hrs etc.

A variety of conditions for synthesis of catalysts in accordance with one or more embodiments of the present invention are described in the examples below. It will be understood, of course, that other synthetic routes are possible. The literature reports a wide variety ways of synthesizing such materials. For instance, silicoaluminophosphates including SAPO-34, 44 and 47 have been reported to be synthesized using a wide range of organic templates, silica, alumina and phosphorus sources. As used herein, the term "template" and the phrase "structure directing agent" are intended to be synonymous. Examples of various synthesis conditions can be found in U.S. Pat. No. 4,440,871, U.S. Pat. No. 6,162,415, U.S. Pat. No. 5,096,684, U.S. Pat. No. 6,914,030, U.S. Pat. No. 7,247,287, and United States patent application Publication No. US 2007/0043249, the content of each of these documents incorporated by reference in its entirety. For example, U.S. Pat. No. 4,440,871, discusses the synthesis of a wide variety of SAPO materials of various framework types, including the preparation of SAPO-34 using tetraethylammonium hydroxide (TEAOH), or isopropylamine, or mixtures of TEAOH and dipropylamine (DPA) as templates. Also disclosed in this patent is a specific example that utilizes cyclohexylamine in the preparation of SAPO-44. In U.S. Pat. No. 6,142,415, relatively pure CHA SAPO-44 was obtained using the same template but with control of the ratio of template to aluminum source and the ratio of phosphorus source to aluminum source. In EP 0 993 867, it was reported that the use of methylbutylamine resulted in SAPO-47 and the use of cyclohexylamine resulted in impure SAPO-44. U.S. Pat. No. 6,914,030 discloses a method of synthesizing pure phase CHA framework type silicoaluminophosphate molecular sieves having relatively low silicon content using synthesis templates that contain at least one dimethylamino moiety, selected from one or more of N,N-dimethylethanolamine, N,N-dimethylpropanolamine, N,N-dimethylbutanolamine, N,N-dimethylheptanolamine, N,N-dimethylhexanolamine, N,N-dimethylethylenediamine, N,N-dimethylbutylenediamine, N,N-dimethylheptylenediamine, N,N-dimethylhexylenediamine 1-dimethylamino-2-propanol, N,N-dimethylethylamine, N,N-dimethylpropylamine, N,N-dimethylpentylamine, N,N-dimethylhexylamine and N,N-dimethylheptylamine.

U.S. Pat. No. 7,247,287 discloses the synthesis of silicoaluminophosphate molecular sieves having the CHA framework type employing a template having the formula: $R^1R^2N-R^3$ wherein $R^1$ and $R^2$ are independently selected from the group consisting of alkyl groups having from 1 to 3 carbon atoms and hydroxyalkyl groups having from 1 to 3 carbon atoms and $R^3$ is selected from the group consisting of 4- to 8-membered cycloalkyl groups, optionally substituted by 1 to 3 alkyl groups having from 1 to 3 carbon atoms; and 4- to 8-membered heterocyclic groups having from 1 to 3 heteroatoms, said heterocyclic groups being optionally substituted by 1 to 3 alkyl groups having from 1 to 3 carbon atoms and the heteroatoms in said heterocyclic groups being selected from the group consisting of O, N, and S. Preferably, the template is selected from N,N-dimethyl-cyclohexylamine, N,N-dimethyl-methyl-cyclohexylamine, N,N-dimethyl-cyclopentylamine, N,N-dimethyl-methyl-cyclopentylamine, N,N-dimethyl-cycloheptylamine, N,N-dimethyl-methylcycloheptylamine, and most preferably is N,N-dimethyl-cyclohexylamine. The synthesis can be effected with or without the presence of fluoride ions and can produce CHA framework type silicoaluminophosphates with a low Si/Al ratio. Alternative synthesis conditions and routes are of course within the scope of the present invention.

Without intending to limit the invention in any manner, embodiments of the present invention will be more fully described by the following examples.

Example 1

A SAPO-34 was prepared from a gel composition of 1.0 $Al_2O_3$:1.06 $P_2O_5$:1.08 $SiO_2$: 2.09 R:66 $H_2O$. A reaction mixture was formed by combining 1.54 kg of 85 wt. % orthophosphoric acid with a mixture of 920 g of a pseudoboehmite alumina (Catapal B) in 1.8 kg of deionized water. Then a further 1 kg of deionized water was added. The mixture was stirred until homogeneous. To this mixture was added a mixture containing 409 g of fumed silica (Aerosil-200), 1.16 kg morpholine (Aldrich, 99%) and 1.5 kg deionized water. The silica-containing mixture was added slowly with stifling and stirred until homogeneous. A further 2.5 kg of deionized water was added and the mixture was stirred until homogenous. The resulting gel was transferred to 5 gallon autoclave where it was aged at 38° C. for 24 hours. This was then heated in the autoclave for 24 hours at 200° C. The crystalline product was recovered via filtration and was washed to a conductivity lower than 200 $\mu Scm^{-1}$. Washing the crystalline product after ion exchange in this manner so that conductivity is sufficiently low, that is below 200 $\mu Scm^{-1}$, results in a crystalline material that is substantially free of non-exchanged metal. The sample was dried before calcining at 540° C. for 4 hours. The crystalline product had an X-ray powder diffraction pattern indicating that it was SAPO-34, a non-zeolitic molecular sieve with the chabazite topology.

By XRF chemical analysis, the composition of the solids product was established to be 0.19 wt % C, 49.63 wt % $Al_2O_3$, 26.92 wt % $P_2O_5$, and 23.14 wt % $SiO_2$.

An $NH_4^+$-form of SAPO-34 was prepared by exchanging 350 g of the calcined SAPO-34 in a solution of ammonium nitrate (1750 g 54 wt % ammonium nitrate mixed with 1750 g of deionized water). The pH was adjusted to 3 by addition of ammonium hydroxide prior to heating the solution to 80° C. The exchange was carried out by agitating the slurry at 80° C. for 1 hour, during which the pH was between 2.57 and 3. The solid was then filtered on a Buchner filter and washed until the filtrate had a conductivity lower than 200 $\mu Scm^{-1}$. The powder was then dried for 16 hours before carrying out the above ammonium exchange process for a total of two exchanges.

A Cu-SAPO34 powder catalyst was prepared by mixing 350 g of $NH_4^+$-form SAPO-34, with 1.31 L of a copper(II) sulfate solution of 1.0 M. An ion-exchange reaction between the $NH_4^+$-form SAPO-34 and the copper ions was carried out by agitating the slurry at 70° C. for 1 hour. The pH was between 2.9 and 3.2 during the reaction. The resulting mixture was then filtered, washed until the filtrate had a conductivity lower than 200 $\mu Scm^{-1}$, which indicated that substantially no soluble or free copper remained in the sample, and the washed sample was dried at 90° C. The above process including the ion-exchange, filtering, washing and drying was repeated to give a total of 2 exchanges. The pH of the second exchange was between 2.9 and 3.1 during the reaction. The obtained Cu-SAPO34 catalyst comprised CuO at 3.31% by weight, as determined by ICP analysis. The BET surface area of this sample as prepared was 417 $m^2/g$. The BET surface area of this sample after aging at 800° C. in 10% steam for 50 hours was 406 $m^2/g$.

A Cu-SAPO34 slurry was prepared by mixing 90 g of Cu-SAPO34, as described above, with 215 mL of deionized water. The mixture was ball-milled for 11 hours to obtain a slurry which comprised 90% particles smaller than 10 μm. 15.8 g of zirconyl acetate in dilute acetic acid (containing 30% $ZrO_2$) was added into the slurry with agitation.

The slurry was coated onto 1"D×3"L cellular ceramic cores, having a cell density of 400 cpsi (cells per square inch) and a wall thickness of 6.5 mil. The coated cores were dried at 110° C. for 3 hours and calcined at 400° C. for 1 hour. The coating process was repeated once to obtain a target washcoat loading of 2.4 $g/in^3$.

Nitrogen oxides selective catalytic reduction (SCR) efficiency and selectivity of a fresh catalyst core was measured by adding a feed gas mixture of 500 ppm of NO, 500 ppm of $NH_3$, 10% $O_2$, 5% $H_2O$, balanced with $N_2$ to a steady state reactor containing a 1"D×3"L catalyst core. For the catalytic test, the washcoated core is shaped into a square cross section wrapped with a ceramic insulation mat and placed inside an Inconel reactor tube heated by an electrical furnace. The gases, $O_2$ (from air), N2 and H2O are preheated in a preheater furnace before entering the reactor. The reactive gases NO and NH3 are introduced between the preheater furnace and the reactor. The catalyst is coated on the aforementioned 400 cpsi (cells per square inch) core to target a loading between 2 and 2.5 $g/in^3$. The reaction was carried at a space velocity of 80,000 $hr^{-1}$ across a 150° C. to 460° C. temperature range. Space velocity is defined as the gas flow rate comprising the entire reaction mixture divided by the geometric volume of the catalyst core. These conditions define the standard test for fresh catalysts.

Hydrothermal stability of the catalyst was measured by hydrothermal aging of a fresh catalyst core in the presence of 10% $H_2O$ at one of the following conditions, 750° C. for 25 hours, 800° C. for 50 hours, and 850° C. for 6 hours followed by measurement of the nitrogen oxides SCR efficiency and selectivity by the same process, as outlined above, for the SCR evaluation on a fresh catalyst core. The standard test of an aged catalyst evaluates a catalyst aged at 800° C. for 50 hrs.

Figure 2:
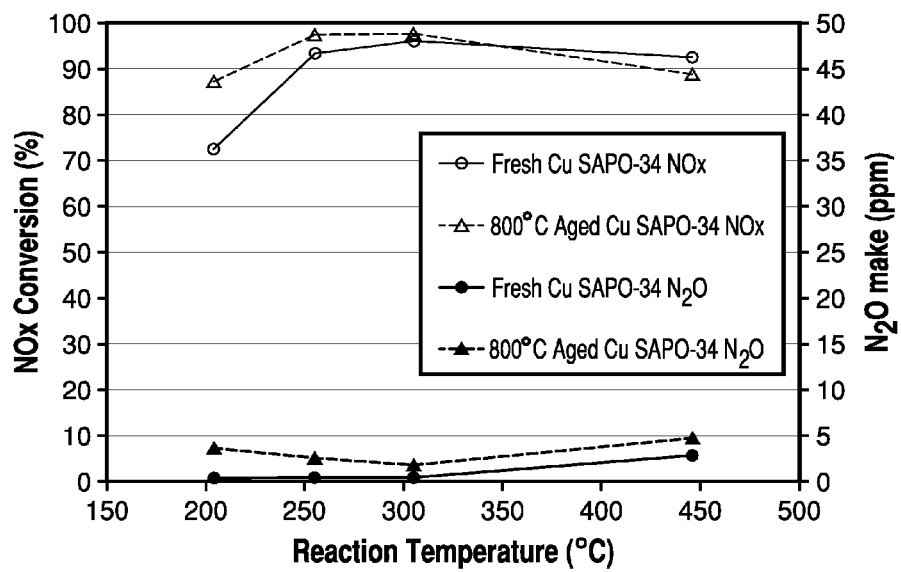
FIG. 2 is a graph depicting nitrogen oxides removal efficiency (%), and $N_2O$ generated (ppm) as a function of reaction temperatures for a Cu-SAPO34 catalyst containing 3.31 wt % CuO prepared according to the methods of Example 1.
Figure 3:
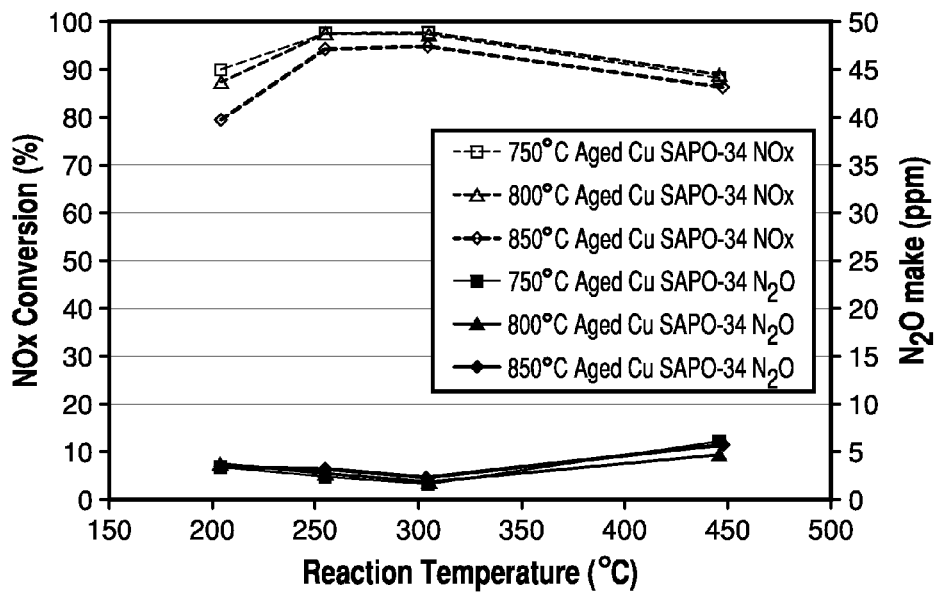
FIG. 3 is a graph depicting nitrogen oxides removal efficiency (%), and $N_2O$ generated (ppm) as a function of reaction temperatures for aged versions of the Cu-SAPO34 catalyst containing 3.31 wt % CuO prepared according to the methods of Example 1.

FIG. 2 is a graph showing the NOx conversion and $N_2O$ make or formation versus temperature for the fresh sample and the sample aged at 800° C. In FIG. 2, the fresh NOx conversion at 200° C. is about 72%, and the NOx conversion for the aged sample at 200° C. is 87%. FIG. 3 is a graph showing the NOx Conversion and $N_2O$ formation versus aging temperatures for the aged samples. As seen in FIG. 2, the NOx conversion at 200° C. for the sample aged 750° C. was 90% and for the sample aged at 850° C. was about 80%. The $N_2O$ make for the fresh sample at 200° C. was 1 ppm, and the maximum value over the range of 200° C. to 450° C. was 3 ppm. For the sample aged at 800° C. the $N_2O$ make at 200° C. was 4 ppm, and the maximum value over the range of 200° C. to 450° C. was 5 ppm.

Example 2

The $NH_4^+$-form of SAPO-34 was formed using the same hydrothermal synthesis and ammonium exchange conditions detailed in example 1.

A Cu-SAPO34 powder catalyst was prepared by mixing 320 g of $NH_4^+$-form SAPO-34 with 1.28 L of a copper(II) acetate monohydrate solution of 0.5 M. The pH was between 4.0 and 4.3 during the reaction. An ion-exchange reaction between the $NH_4^+$-form SAPO-34 and the copper ions was carried out by agitating the slurry at 70° C. for 1 hour. The resulting mixture was then filtered, washed until the filtrate had a conductivity lower than 200 $\mu Scm^{-1}$, which indicated that substantially no soluble or free copper remained in the sample, and the washed sample was dried at 90° C. The obtained Cu-SAPO34 catalyst comprised CuO at 3.18% by weight. The BET surface area of this sample as prepared was 307 $m^2/g$. The BET surface area of this sample after aging at 850° C. in 10% steam for 6 hours was 303 $m^2/g$.

Figure 4:
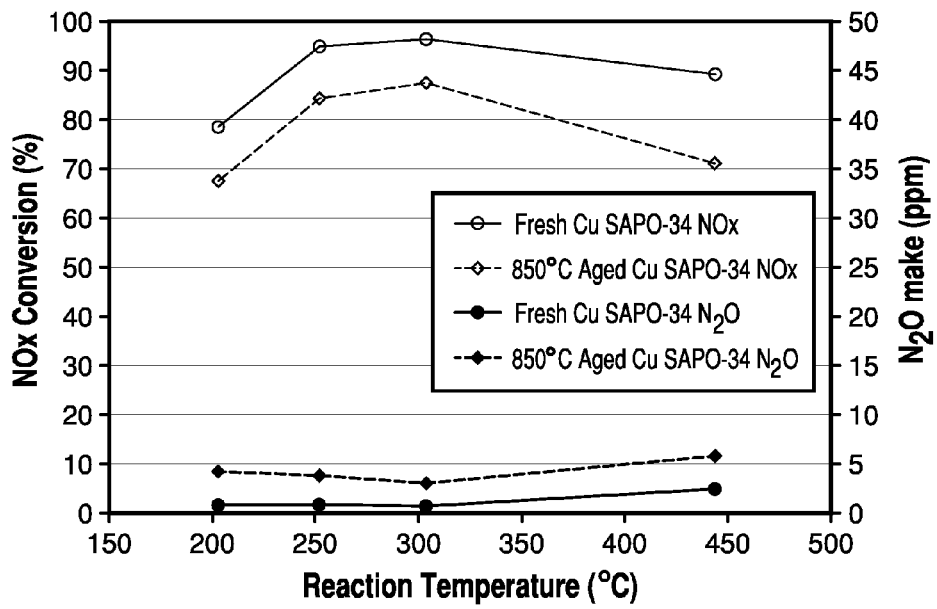
FIG. 4 is a graph depicting nitrogen oxides removal efficiency (%), ammonia consumption (%) and $N_2O$ generated (ppm) as a function of reaction temperature for a Cu-SAPO34 catalyst containing 3.18 wt % CuO prepared according to the methods of Example 2.

The slurry preparation, coating and SCR $NO_x$ evaluation were the same as outlined above for Example 1 with the exception that the catalyst was only aged at 800° C. for 50 hours. FIG. 4 is a graph showing the NOx conversion and $N_2O$ make or formation versus temperature for this sample. The NOx conversion for a fresh sample at 200° C. was 79%, and for sample aged at 850° C. for 10 hours was about 68%. While the NOx conversion of this sample was not as high as Examples 1, 11 and 12, similar to Example 4 below, the fresh surface area was relatively low at 307 $m^2/g$, and the surface area when aged at 850° C. was 303 $m^2/g$. It is unclear if the lower NOx conversion was due to surface area or if other factors affected NOx performance.

Example 3

A SAPO-44 was prepared from a gel composition of 1.0 $Al_2O_3$:1.0 $P_2O_5$:1.0 $SiO_2$: 1.9 R:63 $H_2O$. A reaction mixture was formed by combining 1.54 kg of 85 wt. % orthophosphoric acid with a mixture of 971 g of a pseudoboehmite alumina (Catapal B) in 4 kg of deionized water. The mixture was stirred until homogeneous. To this mixture was added a mixture containing 399.6 g of fumed silica (Aerosil-200), 1.25 kg cyclohexylamine (Aldrich, 99%) and 2.66 kg deionized water. The silica-containing mixture was added slowly with stirring and stirred until homogeneous. The resulting gel was transferred to 5 gallon autoclave where it was heated in the autoclave for 48 hours at 190° C. The crystalline product was recovered via filtration and was washed to a conductivity lower than 200 $\mu Scm^{-1}$. The sample was dried before calcining at 600° C. for 4 hours. The crystalline product had an X-ray powder diffraction pattern indicating that it was SAPO-44, a non-zeolitic molecular sieve with the chabazite topology.

By XRF chemical analysis, the composition of the solids product was established to be 42.51 wt % $Al_2O_3$, 35.93 wt % $P_2O_5$, and 21.17 wt % $SiO_2$.

An $NH_4$-form of SAPO-44 was prepared by exchanging 350 g of the calcined SAPO-44 in a solution of ammonium nitrate (1750 g 54 wt % ammonium nitrate mixed with 1750 g of deionized water). The pH was adjusted to 3 by addition of ammonium hydroxide prior to heating the solution to 80° C. The exchange was carried out by agitating the slurry at 80° C. for 1 hour, during which the pH was between 2.57 and 3. The solid was then filtered on a Buchner filter and washed until the filtrate had conductivity lower than 200 $\mu Scm^{-1}$. The powder was then dried for 16 hours before carrying out the above ammonium exchange process for a total of two exchanges.

A CuSAPO-44 catalyst comprising 3.78% CuO by weight was prepared by the same process as that in Example 1. The pH of both exchanges were between 2.6 and 2.7 throughout the exchange. Using the procedure in Example 1, 300 grams of CuSAPO-44 at 3.78% CuO by weight was prepared.

Figure 5:
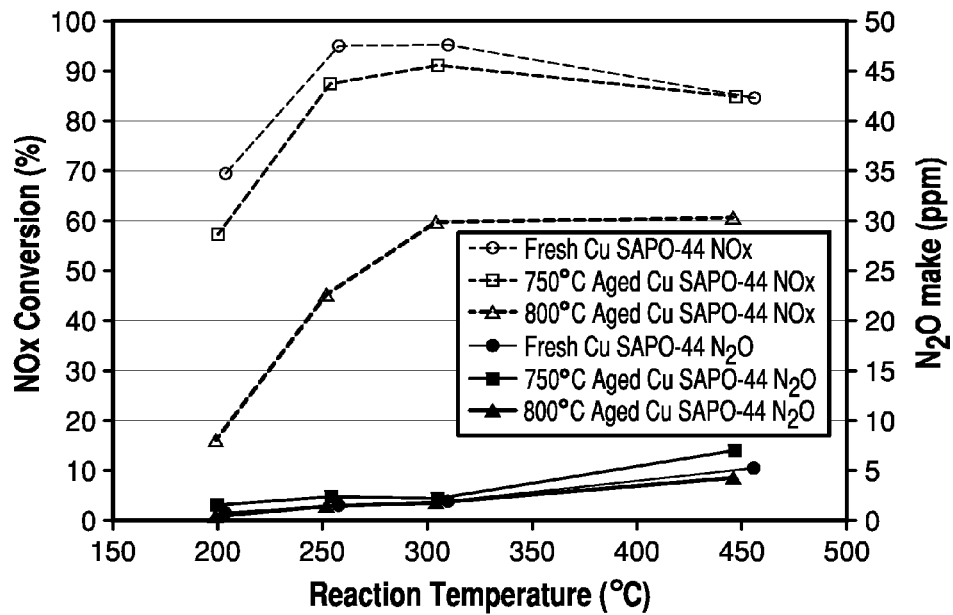
FIG. 5 is a graph depicting nitrogen oxides removal efficiency (%) and $N_2O$ generated (ppm) as a function of aging temperature for a CuSAPO-44 catalyst containing 3.78 wt % CuO prepared according to the methods of Example 3.

The slurry preparation, coating and SCR $NO_x$ evaluation were the same as outlined above for Example 1 with the exception that the catalyst was aged at 750° C. for 25 hours and 800° C. for 50 hours. FIG. 5 is a graph showing the NOx Conversion and $N_2O$ formation versus aging temperatures for this sample.

Example 4

A SAPO-34 was prepared from a gel composition of 1.0 $Al_2O_3$:1.06 $P_2O_5$:1.08 $SiO_2$:2.09 R:66 $H_2O$. A reaction mixture was formed by combining 1.54 kg of 85 wt. % orthophosphoric acid with a mixture of 920 g of a pseudoboehmite alumina (Catapal B) in 1.8 kg of deionized water. Then a further 1 kg of deionized water was added. The mixture was stirred until homogeneous. To this mixture was added a mixture containing 1022.5 g of colloidal silica (Ludox AS40), 1.16 kg morpholine (Aldrich, 99%) and 886.5 g deionized water. The silica-containing mixture was added slowly with stifling and stirred until homogeneous. A further 2.5 kg of deionized water was added and the mixture was stirred until homogenous. The resulting gel was transferred to 5 gallon autoclave where it was aged at 38° C. for 24 hours. This was then heated in the autoclave for 24 hours at 200° C. The crystalline product was recovered via filtration and was washed to a conductivity lower than 200 $\mu Scm^{-1}$. The sample was dried before calcining at about 640° C. for 4 hours.

An $NH_4$-form of SAPO-34 was prepared by exchanging 350 g of the calcined SAPO-34 in a solution of ammonium nitrate (1750 g 54 wt % ammonium nitrate mixed with 1750 g of deionized water). The pH was adjusted to 4 by addition of ammonium hydroxide prior to heating the solution to 80° C. The exchange was carried out by agitating the slurry at 80° C. for 1 hour. The solid was then filtered on a Buchner filter and washed until the filtrate had a conductivity lower than 200 $\mu Scm^{-1}$. The powder was then dried for 16 hours before carrying out the above ammonium exchange process for a total of two exchanges.

A Cu-SAPO34 powder catalyst was prepared by mixing 350 g of $NH_4^+$-form SAPO-34, with 1.31 L of a copper(II) sulfate solution of 1.0 M. An ion-exchange reaction between the $NH_4^+$-form SAPO-34 and the copper ions was carried out by agitating the slurry at 70° C. for 1 hour. The resulting mixture was then filtered, washed until the filtrate had a conductivity of lower than 200 $\mu Scm^{-1}$, which indicated that substantially no soluble or free copper remained in the sample, and the washed sample was dried at 90° C. The above process including the ion-exchange, filtering, washing and drying was repeated to give a total of 2 exchanges. The pH of both exchanges were between 2.8 and 3.2 throughout the exchange.

The obtained Cu-SAPO34 catalyst comprised CuO at 3.71% by weight, as determined by ICP analysis. The BET surface area of this sample as prepared was 309 $m^2/g$. The BET surface area of this sample after aging at 800° C. in 10% steam for 50 hours was 264 $m^2/g$.

Figure 6:
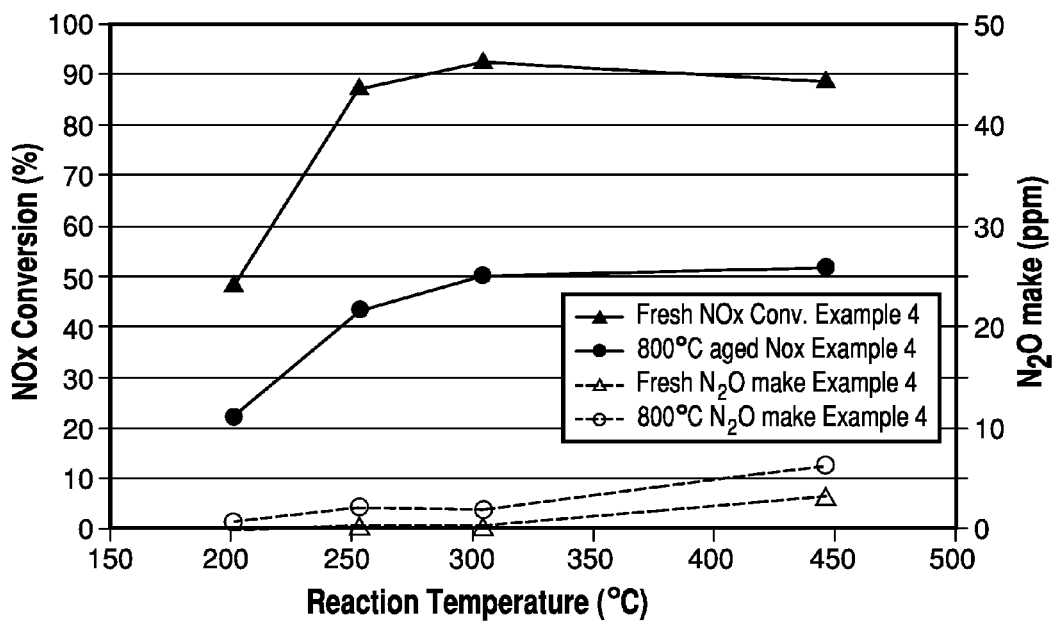
FIG. 6 is a graph depicting nitrogen oxides removal efficiency (%) and $N_2O$ generated (ppm) as a function of aging temperature for a Cu-SAPO34 catalyst prepared according to the methods of Example 4.

The slurry preparation, coating and SCR $NO_x$ evaluation were the same as outlined above for Example 1 with the exception that the catalyst was aged at 750° C. for 25 hours and 800° C. for 50 hours. FIG. 6 is a graph showing the NOx Conversion and $N_2O$ formation versus aging temperatures for this sample. The NOx conversion at 200° C. for the fresh sample was about 49% and for the sample at 800° C. was about 22%. While it is not entirely understood why this sample exhibited poorer NOx conversion than the others, it is noted that the fresh surface area of this sample was on the low end of the samples tested at 309 m²/g, and the aged surface area at 800° C. was at 264 m²/g.

Example 5

Cu-SAPO34

A SAPO-34 is prepared from a gel composition of 1.0 $Al_2O_3$:1.06 $P_2O_5$:1.08 $SiO_2$:1.05 $(TEA)_2O$:66 $H_2O$. A reaction mixture is formed by combining 1.54 kg of 85 wt. % orthophosphoric acid with a mixture of 920 g of a pseudoboehmite alumina (Catapal B) in 1.8 kg of deionized water. Then a further 1 kg of deionized water is added. The mixture is stirred until homogeneous. To this mixture is added a mixture containing 409 g of fumed silica (Aerosil-200), 4.86 kg 40 wt % tetraethylammonium hydroxide (Aldrich). The silica-containing mixture is added slowly with stifling and stirred until homogeneous. A further 1085.25 g of deionized water is added and the mixture is stirred until homogenous. A portion of the resulting gel is transferred to 5 gallon autoclave where it is aged at 38° C. for 24 hours. This is then heated in the autoclave for 24 hours at 200° C. The crystalline product is recovered via filtration and is washed to a conductivity lower than 200 μScm−1. The sample is dried before calcining at 540° C. for 4 hours.

An $NH_4$-form of SAPO-34 is prepared by exchanging 350 g of the calcined SAPO-34 in a solution of ammonium nitrate (1750 g 54 wt % ammonium nitrate mixed with 1750 g of deionized water). The pH is adjusted to 4 by addition of ammonium hydroxide prior to heating the solution to 80° C. The exchange is carried out by agitating the slurry at 80° C. for 1 hour. The solid is then filtered on a Buchner filter and washed until the filtrate had a conductivity lower than 200 μScm−1. The powder is then dried for 16 hours before carrying out the above ammonium exchange process for a total of two exchanges.

A Cu-SAPO34 powder catalyst is prepared by mixing 350 g of NH4+-form SAPO-34, with 1.31 L of a copper(II) sulfate solution of 1.0 M. An ion-exchange reaction between the NH4+-form SAPO-34 and the copper ions is carried out by agitating the slurry at 70° C. for 1 hour. The resulting mixture is then filtered, washed until the filtrate had a conductivity of lower than 200 μScm−1, which indicated that substantially no soluble or free copper remained in the sample, and the washed sample is dried at 90° C. The above process including the ion-exchange, filtering, washing and drying is repeated to give a total of 2 exchanges.

Example 6

A SAPO-34 is prepared from a gel composition of 1.0 Al2O3:1.06 P2O5:1.08 SiO2:2.09 i-PrNH2:66 H2O. A reaction mixture is formed by combining 1.54 kg of 85 wt. % orthophosphoric acid with a mixture of 920 g of a pseudoboehmite alumina (Catapal B) in 1.8 kg of deionized water. Then a further 1 kg of deionized water is added. The mixture is stirred until homogeneous. To this mixture is added a mixture containing 409 g of fumed silica (Aerosil-200), 778.7 g isopropylamine (i-PrNH2, Aldrich, 99%) and 1.5 kg deionized water. The silica-containing mixture is added slowly with stirring and stirred until homogeneous. A further 2.5 kg of deionized water is added and the mixture is stirred until homogenous. A portion of the resulting gel is transferred to 5 gallon autoclave where it is aged at 38° C. for 24 hours. This is then heated in the autoclave for 24 hours at 200° C. The crystalline product is recovered via filtration and is washed to a conductivity lower than 200 μScm−1. The sample is dried before calcining at 540° C. for 4 hours.

An NH4-form of SAPO-34 is prepared by exchanging 350 g of the calcined SAPO-34 in a solution of ammonium nitrate (1750 g 54 wt % ammonium nitrate mixed with 1750 g of deionized water). The pH is adjusted to 4 by addition of ammonium hydroxide prior to heating the solution to 80° C. The exchange is carried out by agitating the slurry at 80° C. for 1 hour. The solid is then filtered on a Buchner filter and washed until the filtrate had a conductivity lower than 200 μScm−1. The powder is then dried for 16 hours before carrying out the above ammonium exchange process for a total of two exchanges.

A Cu-SAPO34 powder catalyst is prepared by mixing 350 g of NH4+-form SAPO-34, with 1.31 L of a copper(II) sulfate solution of 1.0 M. An ion-exchange reaction between the NH4+-form SAPO-34 and the copper ions is carried out by agitating the slurry at 70° C. for 1 hour. The resulting mixture is then filtered, washed until the filtrate had a conductivity of lower than 200 μScm−1, which indicated that substantially no soluble or free copper remained in the sample, and the washed sample is dried at 90° C. The above process including the ion-exchange, filtering, washing and drying is repeated to give a total of 2 exchanges.

Example 7

A SAPO-34 is prepared from a gel composition of 1.0 Al2O3:1.06 P2O5:1.08 SiO2:1.05 (Pr2NH):0.53 (TEA)2O:66 H2O. A reaction mixture is formed by combining 1.54 kg of 85 wt. % orthophosphoric acid with a mixture of 920 g of a pseudoboehmite alumina (Catapal B) in 1.8 kg of deionized water. Then a further 1 kg of deionized water is added. The mixture is stirred until homogeneous. To this mixture is added a mixture containing 409 g of fumed silica (Aerosil-200), 2.46 kg of 40 wt % tetraethylamonium hydroxide (Aldrich), 669.7 g di-n-propylamine (Aldrich, 99%). The silica-containing mixture is added slowly with stifling and stirred until homogeneous. A further 2.5 kg of deionized water is added and the mixture is stirred until homogenous. A portion of the resulting gel is transferred to 5 gallon autoclave where it is aged at 38° C. for 24 hours. This is then heated in the autoclave for 24 hours at 200° C. The crystalline product is recovered via filtration and is washed to a conductivity lower than 200 μScm−1. The sample is dried before calcining at 540° C. for 4 hours.

An NH4-form of SAPO-34 is prepared by exchanging 350 g of the calcined SAPO-34 in a solution of ammonium nitrate (1750 g 54 wt % ammonium nitrate mixed with 1750 g of deionized water). The pH is adjusted to 4 by addition of ammonium hydroxide prior to heating the solution to 80° C. The exchange is carried out by agitating the slurry at 80° C. for 1 hour. The solid is then filtered on a Buchner filter and washed until the filtrate had a conductivity lower than 200 μScm−1. The powder is then dried for 16 hours before carrying out the above ammonium exchange process for a total of two exchanges.

A Cu-SAPO34 powder catalyst is prepared by mixing 350 g of NH4+-form SAPO-34, with 1.31 L of a copper(II) sulfate solution of 1.0 M. An ion-exchange reaction between the NH4+-form SAPO-34 and the copper ions is carried out by agitating the slurry at 70° C. for 1 hour. The resulting mixture is then filtered, washed until the filtrate had a conductivity of lower than 200 μScm−1, which indicated that substantially no soluble or free copper remained in the sample, and the washed sample is dried at 90° C. The above process including the ion-exchange, filtering, washing and drying is repeated to give a total of 2 exchanges.

Example 8

A SAPO-34 is prepared from a gel composition of 1.0 Al2O3:1.06 P2O5:1.08 SiO2:2.09 Pr2NH:66 H2O. A reaction mixture is formed by combining 1.54 kg of 85 wt. % orthophosphoric acid with a mixture of 920 g of a pseudo-boehmite alumina (Catapal B) in 1.8 kg of deionized water. Then a further 1 kg of deionized water is added. The mixture is stirred until homogeneous. To this mixture is added a mixture containing 409 g of fumed silica (Aerosil-200), 1.19 kg dipropylamine (Aldrich, 99%) and 1.5 kg deionized water. The silica-containing mixture is added slowly with stifling and stirred until homogeneous. A further 2.5 kg of deionized water is added and the mixture is stirred until homogenous. A portion of the resulting gel is transferred to 5 gallon autoclave where it is aged at 38° C. for 24 hours. This is then heated in the autoclave for 24 hours at 200° C. The crystalline product is recovered via filtration and is washed to a conductivity lower than 200 µScm−1. The sample is dried before calcining at 540° C. for 4 hours.

An NH4-form of SAPO-34 is prepared by exchanging 350 g of the calcined SAPO-34 in a solution of ammonium nitrate (1750 g 54 wt % ammonium nitrate mixed with 1750 g of deionized water). The pH is adjusted to 4 by addition of ammonium hydroxide prior to heating the solution to 80° C. The exchange is carried out by agitating the slurry at 80° C. for 1 hour. The solid is then filtered on a Buchner filter and washed until the filtrate had a conductivity lower than 200 µScm−1. The powder is then dried for 16 hours before carrying out the above ammonium exchange process for a total of two exchanges.

A Cu-SAPO34 powder catalyst is prepared by mixing 350 g of NH4+-form SAPO-34, with 1.31 L of a copper(II) sulfate solution of 1.0 M. An ion-exchange reaction between the NH4+-form SAPO-34 and the copper ions is carried out by agitating the slurry at 70° C. for 1 hour. The resulting mixture is then filtered, washed until the filtrate had a conductivity of lower than 200 µScm−1, which indicated that substantially no soluble or free copper remained in the sample, and the washed sample is dried at 90° C. The above process including the ion-exchange, filtering, washing and drying is repeated to give a total of 2 exchanges.

Example 9

A SAPO-34 is prepared from a gel composition of 1.0 Al2O3:1.06 P2O5:1.08 SiO2:1.05 Pr2NH:1.05 DEA:66 H2O. A reaction mixture is formed by combining 1.54 kg of 85 wt. % orthophosphoric acid with a mixture of 920 g of a pseudoboehmite alumina (Catapal B) in 1.8 kg of deionized water. Then a further 1 kg of deionized water is added. The mixture is stirred until homogeneous. To this mixture is added a mixture containing 409 g of fumed silica (Aerosil-200), 669.7 g of dipropylamine (Pr2NH Aldrich, 99%), 695.9 g diethanolamine (DEA Aldrich, >98.5%) and 1.5 kg deionized water. The silica-containing mixture is added slowly with stirring and stirred until homogeneous. A further 2.5 kg of deionized water is added and the mixture is stirred until homogenous. A portion of the resulting gel is transferred to 5 gallon autoclave where it is aged at 38° C. for 24 hours. This is then heated in the autoclave for 24 hours at 200° C. The crystalline product is recovered via filtration and is washed to a conductivity lower than 200 µScm−1. The sample is dried before calcining at 540° C. for 4 hours.

An NH4-form of SAPO-34 is prepared by exchanging 350 g of the calcined SAPO-34 in a solution of ammonium nitrate (1750 g 54 wt % ammonium nitrate mixed with 1750 g of deionized water). The pH is adjusted to 4 by addition of ammonium hydroxide prior to heating the solution to 80° C. The exchange is carried out by agitating the slurry at 80° C. for 1 hour. The solid is then filtered on a Buchner filter and washed until the filtrate had a conductivity lower than 200 µScm−1. The powder is then dried for 16 hours before carrying out the above ammonium exchange process for a total of two exchanges.

A Cu-SAPO34 powder catalyst is prepared by mixing 350 g of NH4+-form SAPO-34, with 1.31 L of a copper(II) sulfate solution of 1.0 M. An ion-exchange reaction between the NH4+-form SAPO-34 and the copper ions is carried out by agitating the slurry at 70° C. for 1 hour. The resulting mixture is then filtered, washed until the filtrate had a conductivity of lower than 200 µScm−1, which indicated that substantially no soluble or free copper remained in the sample, and the washed sample is dried at 90° C. The above process including the ion-exchange, filtering, washing and drying is repeated to give a total of 2 exchanges.

Example 10

A SAPO-34 is prepared from a gel composition of 1.0 Al2O3:1.06 P2O5:1.08 SiO2:1.05 Pr3N:0.53 (TEA)2O:66 H2O. A reaction mixture is formed by combining 1.54 kg of 85 wt. % orthophosphoric acid with a mixture of 920 g of a pseudoboehmite alumina (Catapal B) in 1.8 kg of deionized water. Then a further 1 kg of deionized water is added. The mixture is stirred until homogeneous. To this mixture is added a mixture containing 409 g of fumed silica (Aerosil-200), 2.46 kg of 40 wt % tetraethylammonium hydroxide, 948.2 g tripropylamine (Pr3N Aldrich, 99%). The silica-containing mixture is added slowly with stifling and stirred until homogeneous. A further 2.5 kg of deionized water is added and the mixture is stirred until homogenous. A portion of the resulting gel is transferred to 5 gallon autoclave where it is aged at 38° C. for 24 hours. This is then heated in the autoclave for 24 hours at 200° C. The crystalline product is recovered via filtration and is washed to a conductivity lower than 200 µScm−1. The sample is dried before calcining at 540° C. for 4 hours.

An NH4-form of SAPO-34 is prepared by exchanging 350 g of the calcined SAPO-34 in a solution of ammonium nitrate (1750 g 54 wt % ammonium nitrate mixed with 1750 g of deionized water). The pH is adjusted to 4 by addition of ammonium hydroxide prior to heating the solution to 80° C. The exchange is carried out by agitating the slurry at 80° C. for 1 hour. The solid is then filtered on a Buchner filter and washed until the filtrate had a conductivity lower than 200 µScm−1. The powder is then dried for 16 hours before carrying out the above ammonium exchange process for a total of two exchanges.

A Cu-SAPO34 powder catalyst is prepared by mixing 350 g of NH4+-form SAPO-34, with 1.31 L of a copper(II) sulfate solution of 1.0 M. An ion-exchange reaction between the NH4+-form SAPO-34 and the copper ions is carried out by agitating the slurry at 70° C. for 1 hour. The resulting mixture is then filtered, washed until the filtrate had a conductivity of lower than 200 µScm−1, which indicated that substantially no soluble or free copper remained in the sample, and the washed sample is dried at 90° C. The above process including the ion-exchange, filtering, washing and drying is repeated to give a total of 2 exchanges.

Example 11

A SAPO-34 was prepared from a gel composition of 1.0 Al2O3:0.85 P2O5:0.60 SiO2:3.0 R:32 H2O. A reaction mixture was prepared by mixing 45 kg of DI water and 18.76 kg of phosphoric acid. This was followed by the addition of 10.80 kg of Catapal B alumina to the acid solution over 45 minutes. The alumina digestion was continued for 2 hrs with intensive stirring. Then 22.74 kg of Morpholine was added over a period of 60 minutes. An additional 0.3 kg of water was used at this stage. Upon addition of Morpholine, the temperature rose to approx. 46° C. The slurry was cooled down to approx. 28° C. before the next addition. Then, 7.76 kg of Ludox AS 40 colloidal silica was added, as well as an additional 0.50 kg of DI water. The resulting gel was transferred to a 30 gallon reactor and an additional 2.20 kg of DI water was added.

The reactor temperature was ramped up to 170° C. within 8 hours, and held at this temperature for 48 hours. The crystalline product was recovered via filtration and was washed to a conductivity lower than 200 μScm−1. This product was calcined at 540° C. for 6 hours. The crystalline product had an X-ray powder diffraction pattern indicating that it was SAPO-34, a non-zeolitic molecular sieve with the chabazite topology. The product consisted of crystals in the 3 to 10 μm range. The elemental analysis of the calcined product showed 15.5% SiO2, 40.3% Al2O3, and 44.2% P2O5. The BET surface area was 583 m2/g.

An NH4-form of SAPO-34 was prepared by exchanging 400 g of the calcined SAPO-34 in a solution of ammonium nitrate (2000 g 60 wt % ammonium nitrate mixed with 2000 g of deionized water). The exchange was carried out by agitating the slurry at 80° C. for 1 hour, with the initial pH adjusted to 3.0-3.5 using NH4OH. The solid was then filtered and washed until the filtrate had a conductivity lower than 200 μScm−1.

A Cu-SAPO34 powder catalyst was prepared by ion exchange of the NH4+-form SAPO-34 with a copper (II) acetate solution. The latter solution was prepared by dissolving 63.48 g of copper (II) acetate (Aldrich) in 1590 g DI water. The solution was heated to 70° C., and 400 g NH4-SAPO-34 was then added. The pH was measured to be 4.49 at 70° C. No adjustment was made to the pH. This was allowed to react at 70° C. for one hour. The final pH of the slurry was determined to be 4.03 at 79° C. The resulting mixture was then filtered, washed until the filtrate had a conductivity lower than 200 μScm−1, which indicated that substantially no soluble or free copper remained in the sample, and the washed sample was dried at 90° C. The obtained Cu-SAPO34 catalyst had a copper content of 2.71% by weight, expressed at CuO, as determined by ICP analysis. This Cu-SAPO-34 sample had a BET surface area of 486 m2/g. Two separate samples obtained were hydrothermally aged at 850° C. for 6 hours and 900° C. for 1 hour. After aging, the powder in 10% steam at 850° C. for 6 hours, it had a BET surface area of 550 m2/g.

Figure 7:
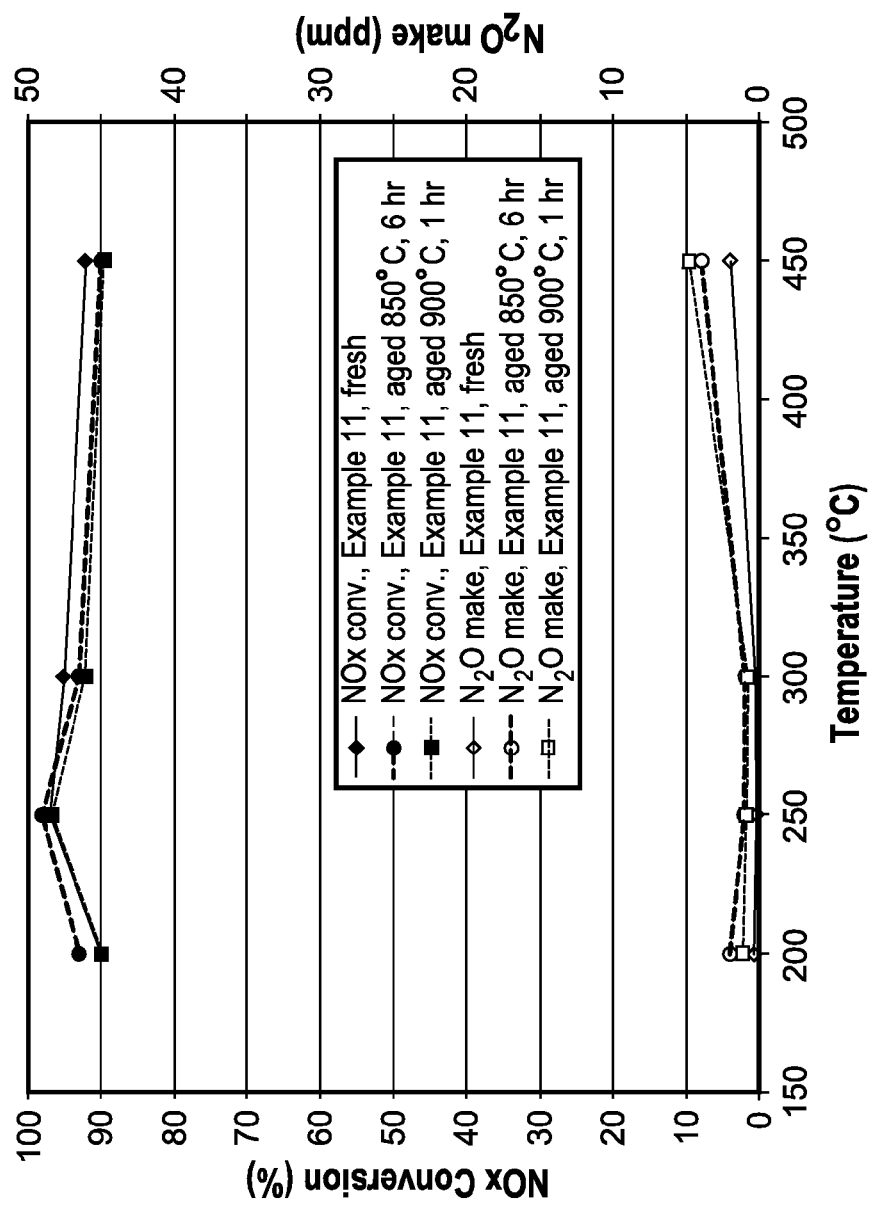
FIG. 7 is a graph depicting nitrogen oxides removal efficiency (%) and $N_2O$ generated (ppm) as a function of aging temperature for a Cu-SAPO34 catalyst prepared according to the methods of Example 11.

The slurry preparation, coating and SCR NOx evaluation were the same as outlined above for Example 1 with the exception that the catalyst was aged at several different temperatures. FIG. 7 is a graph showing the NOx Conversion and N2O formation versus aging temperatures for this sample. The NOx conversion at 200° C. for the fresh sample was 90% and for the sample aged at 850° C., the NOx conversion was 93%, and for the sample age at 900° C., the NOx conversion was 90%. The N2O make for the fresh sample at 200° C. was 0.4 ppm, and the maximum value over the range of 200° C. to 450° C. was 2 ppm. For the sample aged at 850° C. the N2O make at 200° C. was 2 ppm, and the maximum value over the range of 200° C. to 450°C. was 4 ppm. For the sample aged at 900° C. the N2O make at 200° C. was 1 ppm, and the maximum value over the range of 200° C. to 450° C. was 5 ppm.

Example 12

A large scale preparation of SAPO-34 was carried out in a similar fashion as that described in Example 11. The primary difference was the quantities of the ingredients, which were as follows: 3,433 kg DI water, 1,582 kg H3PO4, 970 kg Catapal B alumina, 1,910 kg Morpholine, 657 kg Ludox AS-40, and an additional 630 kg DI water for rinsing and flushing throughout the process. The reactor temperature was ramped up to 169° C. within 8 hours. It was held in the 168-171° C. range for 48.5 hours.

The X-ray diffraction pattern identified the product as SAPO-34, with a small amount (less than 5%) of a secondary phase with the sodalite structure. The calcined powder had a BET surface area of 550 m2/g.

An NH4-form of SAPO-34 was prepared by exchanging 400 g of the calcined SAPO-34 in a solution of ammonium nitrate (2000 g 60 wt % ammonium nitrate mixed with 2000 g of deionized water). The exchange was carried out by agitating the slurry at 80° C. for 1 hour, with the initial pH adjusted to 3.0-3.5 using NH4OH. The solid was then filtered and washed until the filtrate had a conductivity lower than 200 μScm−1.

A Cu-SAPO34 powder catalyst was prepared by ion exchange of the NH4+-form SAPO-34 with a copper (II) acetate solution. The latter solution was prepared by dissolving 63.48 g of copper (II) acetate (Aldrich) in 1590 g DI water. The solution was heated to 70° C., and 400 g NH4-SAPO-34 was then added. The pH was measured to be 4.57 at 66° C. No adjustment was made to the pH. This was allowed to react at 70° C. for one hour. The final pH of the slurry was determined to be 4.14 at 74° C. The resulting mixture was then filtered, washed until the filtrate had a conductivity lower than 200 μScm−1, which indicated that substantially no soluble or free copper remained in the sample, and the washed sample was dried at 90° C.

The obtained Cu-SAPO34 catalyst had a copper content 2.72% by weight, expressed at CuO, as determined by ICP analysis. This Cu-SAPO-34 sample had a BET surface area of 462 m2/g. After aging the powder in 10% steam at 850° C. for 6 hours, it had a BET surface area of 527 m2/g.

Figure 8:
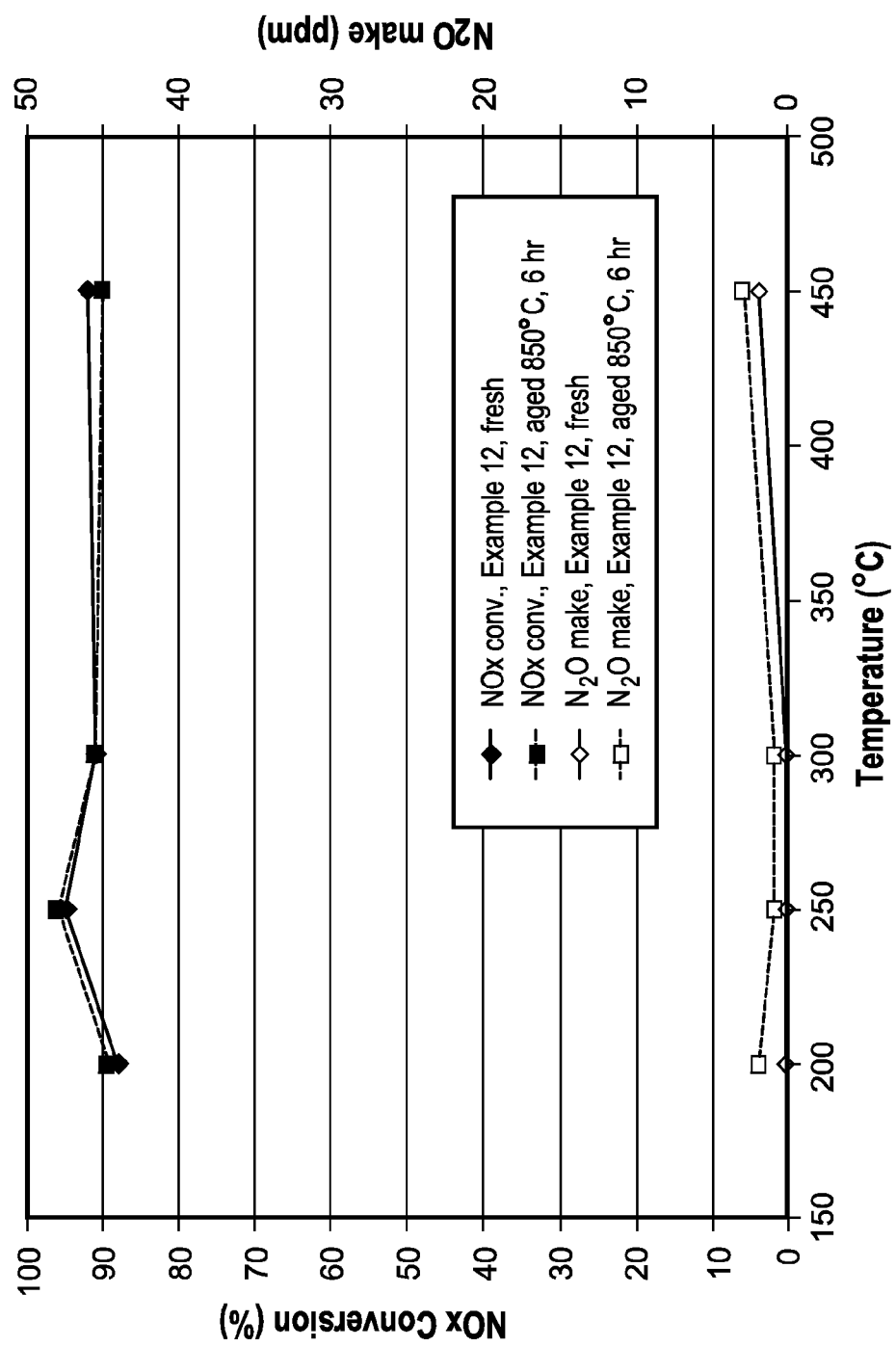
FIG. 8 is a graph depicting nitrogen oxides removal efficiency (%) and $N_2O$ generated (ppm) as a function of aging temperature for a Cu-SAPO34 catalyst prepared according to the methods of Example 12.

The slurry preparation, coating and SCR NOx evaluation were the same as outlined above for Example 1 with the exception that the catalyst was aged at 850° C. at 6 hours and 900° C. for 3 hours. FIG. 8 is a graph showing the NOx Conversion and N2O formation versus aging temperatures for this sample. A fresh sample showed NOx conversion at 200° C. of 88%, and NOx conversion at 200° C. for the sample aged at 850° C. was 89%. The N2O make for the fresh sample at 200° C. was 0.2 ppm, and the maximum value over the range of 200° C. to 450° C. was 2 ppm. For the sample aged at 850° C. the N2O make at 200° C. was 2 ppm, and the maximum value over the range of 200° C. to 450° C. was 3 ppm.

Hydrothermal aging of a sample prepared in accordance with Example 12 at 900° C. for 3 hours significantly decreased the NOx conversion of the sample. The maximum NOx conversion in the temperature range of 200° C. to 450° C. was 65%.

Example 13

A SAPO-34 was prepared from a gel composition of 1.0 Al2O3:0.93 P2O5:0.96 SiO2:3.0 R:32 H2O. A reaction mixture was prepared by mixing 37 kg of DI water and 17.65 kg of phosphoric acid. This was followed by the addition of 9.18 kg of Catapal B alumina to the acid solution over 30 minutes. The alumina digestion was continued for 2 hrs with intensive stirring. Then 19.24 kg of Morpholine was added over a period of 15 minutes. An additional 0.3 kg of water was used at this stage. Upon addition of Morpholine, the temperature rose to approx. 75° C. The slurry was cooled down to approx. 38° C. before the next addition. Then, 10.53 kg of Ludox AS 40 colloidal silica was added, as well as an additional 0.52 kg of DI water. The resulting gel was transferred to a 30 gallon reactor and an additional 2.5 kg of DI water was added.

The reactor temperature was ramped up to 170° C. within 8 hours, and held at this temperature for 48 hours. The crystalline product was recovered via filtration and was washed to a conductivity lower than 200 µScm−1. This product was calcined at 540° C. for 6 hours. The crystalline product had an X-ray powder diffraction pattern indicating that it was SAPO-34, a non-zeolitic molecular sieve with the chabazite topology. The product consisted of crystals in the 3 to 10 µm range. The elemental analysis of the canned product showed 18.4% SiO2, 40.8% Al2O3, and 40.8% P2O5. The calcined powder had a BET surface area of 382 m2/g. After aging the powder in 10% steam at 900° C. for 1 hour, it had a BET surface area of 344 m2/g.

An NH4-form of SAPO-34 was prepared by exchanging 274 g of the calcined SAPO-34 in a solution of ammonium nitrate (1370 g 60 wt % ammonium nitrate mixed with 1370 g of deionized water). The exchange was carried out by agitating the slurry at 80° C. for 1 hour, with the initial pH adjusted to 3.0-3.5 using NH4OH. The solid was then filtered and washed until the filtrate had a conductivity lower than 200 µScm−1.

A Cu-SAPO34 powder catalyst was prepared by ion exchange of the NH4+-form SAPO-34 with a copper (II) acetate solution. The latter solution was prepared by dissolving 31.74 g of copper (II) acetate (Aldrich) in 795 g DI water. The solution was heated to 70° C., and 200 g NH4-SAPO-34 was then added. The pH was measured to be 4.53 at the beginning. No adjustment was made to the pH. This was allowed to react at 70° C. for one hour. The final pH of the slurry was determined to be 4.02. The resulting mixture was then filtered, washed until the filtrate had a conductivity lower than 200 µScm−1, which indicated that substantially no soluble or free copper remained in the sample, and the washed sample was dried at 90° C.

The obtained Cu-SAPO34 catalyst had a copper content 2.89% by weight, expressed at CuO, as determined by ICP analysis.

Figure 9:
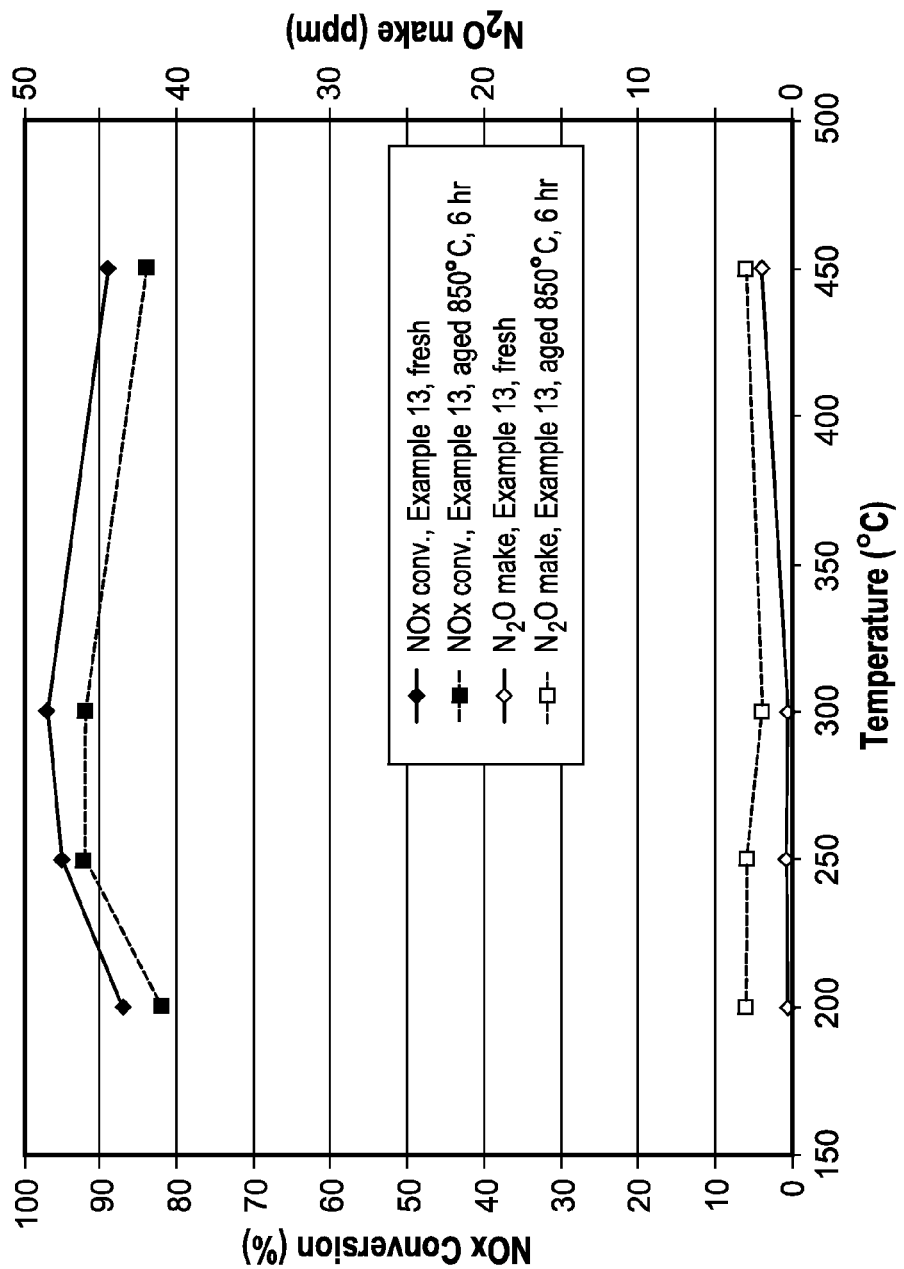
FIG. 9 is a graph depicting nitrogen oxides removal efficiency (%) and $N_2O$ generated (ppm) as a function of aging temperature for a Cu-SAPO34 catalyst prepared according to the methods of Example 13.

The slurry preparation, coating and SCR NOx evaluation were the same as outlined above for Example 1 with the exception that the catalyst was hydrothermally aged at a different temperature, namely 850° C. for 6 hours. FIG. 9 is a graph showing the NOx Conversion and N2O formation versus aging conditions for this sample. As seen in FIG. 9, the fresh sample exhibited NOx conversion of greater than 85% and nearly 90% at 200° C. and higher over the range of 200° C. to 450° C. The N2O make for the fresh sample at 200° C. was 0.3 ppm, and the maximum value over the range of 200° C. to 450° C. was 2 ppm. For the sample aged at 850° C. the N2O make at 200° C. was 3 ppm, and the maximum value over the range of 200° C. to 450° C. was 3 ppm.

Example 14

A SAPO-34 was prepared from a gel composition of 1.0 Al2O3:0.93 P2O5:0.96 SiO2:3.0 R:32 H2O. A reaction mixture was prepared by mixing 37 kg of DI water and 17.65 kg of phosphoric acid. This was followed by the addition of 9.18 kg of Catapal B alumina to the acid solution over 30 minutes. The alumina digestion was continued for 2 hrs with intensive stirring. Then 19.24 kg of Morpholine was added over a period of 15 minutes. An additional 0.3 kg of water was used at this stage. Upon addition of Morpholine, the temperature rose to approx. 75° C. The slurry was cooled down to approx. 38° C. before the next addition. Then, 10.53 kg of Ludox AS 40 colloidal silica was added, as well as an additional 0.52 kg of DI water. The resulting gel was transferred to a 30 gallon reactor and an additional 2.5 kg of DI water was added.

The reactor temperature was ramped up to 170° C. within 8 hours, and held at this temperature for 48 hours. The crystalline product was recovered via filtration and was washed to a conductivity lower than 200 µScm−1. This product was calcined at 540° C. for 6 hours. The crystalline product had an X-ray powder diffraction pattern indicating that it was SAPO-34, a non-zeolitic molecular sieve with the chabazite topology. The product consisted of crystals in the 3 to 10 µm range. The elemental analysis of the calcined product showed 18.4% SiO2, 40.8% Al2O3, and 40.8% P2O5. The calcined powder had a BET surface area of 382 m2/g. After aging the powder in 10% steam at 900° C. for 1 hour, it had a BET surface area of 344 m2/g.

An NH4-form of SAPO-34 was prepared by exchanging 274 g of the calcined SAPO-34 in a solution of ammonium nitrate (1370 g 60 wt % ammonium nitrate mixed with 1370 g of deionized water). The exchange was carried out by agitating the slurry at 80° C. for 1 hour, with the initial pH adjusted to 3.0 using NH4OH. The final pH was 2.45. The solid was then filtered and washed until the filtrate had a conductivity lower than 200 µScm−1.

A Cu-SAPO34 powder catalyst was prepared by ion exchange of the NH4+-form SAPO-34 with a copper (II) acetate solution. The latter solution was prepared by dissolving 15.87 g of copper (II) acetate (Aldrich) in 795 g DI water. The solution was heated to 70° C., and 200 g NH4-SAPO-34 was then added. The pH was measured to be 4.51 at the beginning. No adjustment was made to the pH. This was allowed to react at 70° C. for one hour. The resulting mixture was then filtered, washed until the filtrate had a conductivity lower than 200 µScm−1, which indicated that substantially no soluble or free copper remained in the sample, and the washed sample was dried at 90° C.

The obtained Cu-SAPO34 catalyst had a copper content 1.93% by weight, expressed at CuO, as determined by ICP analysis. This Cu-SAPO-34 sample had a BET surface area of 337 m2/g. After aging the powder in 10% steam at 900° C. for 1 hour, it had a BET surface area of 295 m2/g.

Figure 10:
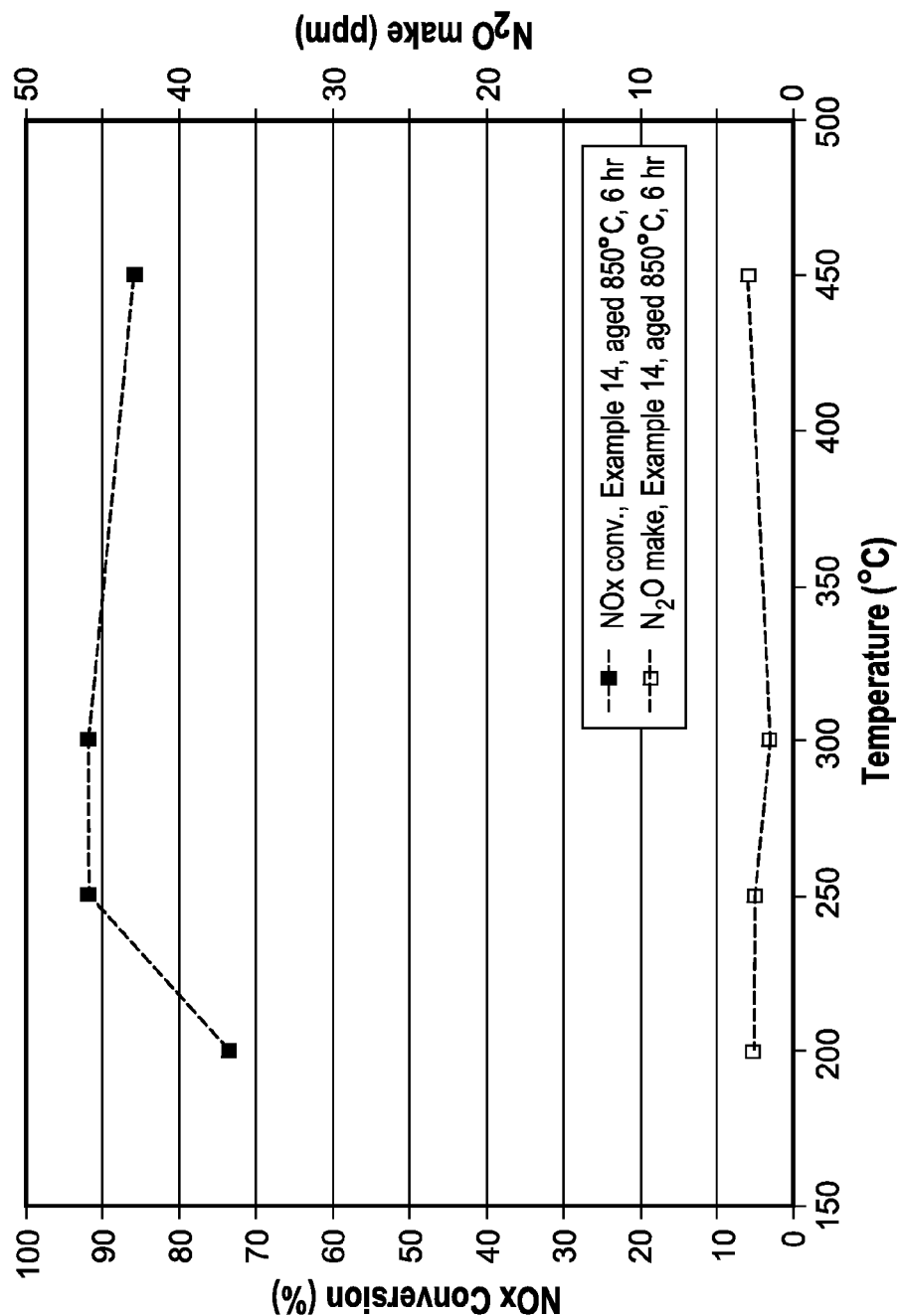
FIG. 10 is a graph depicting nitrogen oxides removal efficiency (%) and $N_2O$ generated (ppm) as a function of aging temperature for a Cu-SAPO34 catalyst prepared according to the methods of Example 14.

The slurry preparation, coating and SCR NOx evaluation were the same as outlined above for Example 1 with the exception that the catalyst was aged at 850° C. for 6 hours. FIG. 10 is a graph showing the NOx conversion and N2O formation for the aged sample. A NOx conversion analysis for a fresh sample was not conducted. As shown in FIG. 10, the NOx conversion at 200° C. was at least about 75%, and the conversion in the range of 250° C. to 450° C. was greater than 85%. The N2O make of the aged sample was 2.6 ppm at 200° C. and the maximum value over the range of 200° C. to 450° C. 3 ppm.

As can be seen from the data of Examples 1, 11 and 12, Cu-SAPO-34 materials in accordance with embodiment of the present invention exhibit excellent NOx conversion for fresh and aged samples exceeding 80%, 85% and 90%, with a NOx conversion retention after aging of at least 85%, at least 90% and at least 95% after aging at either 850° C. for 6 hours or 900° C. for 1 hour. In addition, the ratio of NOx (with NOx referring to NO and NO2) in an exhaust gas stream after passing through the catalyst to N2O in the gas stream after passing through the Cu-SAPO-34 catalyst material is less than great than 2.5:1, more specifically 5:1, and even more specifically Comparative Example 15

A zeolitic CuCHA catalyst comprising 3.36% CuO by weight was prepared as follows followed by an incipient wetness impregnation. A zeolitic CuCHA powder catalyst was prepared by mixing 17 Kg of commercially available NH4+-form CHA zeolite, having a silica/alumina mole ratio of 30, with 68 L of a copper(II) sulfate solution of 1.0 M. The pH was adjusted to 3.5 with nitric acid. An ion-exchange reaction between the NH4+-form CHA and the copper ions was carried out by agitating the slurry at 80° C. for 1 hour. The resulting mixture was then filtered and air-dried. The above process including the ion-exchange and filtering was repeated once. Then the wet filter cake was reslurried into 40 L deionized water followed by filtering and drying at 90° C. The resulting CuCHA product was then calcined at 640° C. in air for 6 hours.

134 grams of CuCHA at 3.11% CuO by weight was prepared as follows. A CuCHA slurry was prepared by mixing 90 g of CuCHA, as described above, with 215 mL of deionized water. The mixture was ball-milled. 15.8 g of zirconyl acetate in dilute acetic acid (containing 30% ZrO2) was added into the slurry with agitation.

The slurry was coated onto 1"Dx3"L cellular ceramic cores, having a cell density of 400 cpsi (cells per square inch) and a wall thickness of 6.5 mil. The coated cores were dried at 110° C. for 3 hours and calcined at 400° C. for 1 hour. The coating process was repeated once to obtain a target washcoat loading of 2.4 g/in3. To this material, was added a copper sulfate solution comprised of 1.64 g of copper sulfate pentahydrate and 105 mL of deionized water. The impregnated sample was dried at 90° C. and calcined at 640° C. for 6 hours.

Comparative Example 16

Cu/Y

A Cu/Y zeolite powder catalyst was prepared having silica/alumina mole ratio of 5 as described further below.

A Cu/Y powder catalyst was prepared by mixing 500 g of NH4+-form Zeolite Y, having a silica/alumina mole ratio of ~5, with 2500 mL of a copper(II) sulfate solution of 0.1 M. The pH was between 2.9 and 3.3. An ion-exchange reaction between the NH4+-form Y zeolite and the copper ions was carried out by agitating the slurry at 80° C. for 1 hour. The resulting mixture was then filtered, washed with deionized water and dried at 90° C. The above process including the ion-exchange, filtering, washing and drying was repeated for a total of 5 exchanges where pH was similar to above. The resulting Cu Zeolite Y product was then calcined at 640° C. in air for 16 hours. The obtained Cu Zeolite Y catalyst comprised CuO at 4.60% by weight.

The Cu/Y slurry was prepared by mixing 200 g of Cu/Y, as described above, with 400 mL of deionized water. The mixture was milled by passing twice through an Eigermill to obtain a slurry which comprised 90% particles smaller than 8 μm. 8.7 g of zirconyl acetate in dilute acetic acid (containing 30% ZrO2) was added into the slurry with agitation.

The slurry was coated onto 1"Dx3"L cellular ceramic cores, having a cell density of 400 cpsi (cells per square inch) and a wall thickness of 6.5 mil. Two coats were required to obtain a target washcoat loading of 1.6 g/in3. The coated cores were dried at 90° C. for 3 hours, and the cores were calcined at 450° C. for 1 hour after the second drying step.

The hydrothermal aging and SCR evaluation are the same as outlined in Example 1, except aging at was performed 750° C. for 25 hours.

Comparative Example 17

A Cu/Beta powder catalyst was prepared having silica/alumina mole ratio is 35 using a procedure similar to the sample prepared in comparative EXAMPLE 15. The hydrothermal aging and SCR evaluation are the same as outlined in Example 1.

TABLE 1

| Example | Cu/Al Atomic ratio | CuO% | NO$_x$ conversion (%) | | | | N$_2$O make, ppm | |
|---|---|---|---|---|---|---|---|---|
| | | | 210° C., fresh | 210° C., aged | 460° C., fresh | 460° C., aged | 460° C., fresh | 460° C., aged |
| Com. 15 | 0.38 | 3.36 | 74 | 70 | 91 | 81 | 2.7 | 10.5 |
| Com. 16 | 0.23 | 4.6 | 43 | 42 | 99 | 96 | 26 | 51 |
| Com. 17 | 0.36 | 2.5 | 92 | 23 | 84 | 53 | 10 | 9.4 |

It will be apparent to those skilled in the art that various modifications and variations can be made to the present invention without departing from the spirit or scope of the invention. It is also noted that these materials can be synthesized using a range of temperatures and reaction times. Thus, it is intended that the present invention cover modifications and variations of this invention provided they come within the scope of the appended claims and their equivalents.

What is claimed is:

1. An emission treatment system for treatment of an exhaust gas stream comprising NOx and particulate matter, the emission treatment system comprising:
   a SCR catalyst substrate containing a catalyst comprising a Cu-loaded non-zeolitic molecular sieve having a CHA crystal structure; and
   an ammonia injector or an ammonia-precursor injector positioned upstream of the SCR catalyst substrate for injecting ammonia or an ammonia-precursor, wherein the catalyst is effective to promote the reaction of ammonia with nitrogen oxides to form nitrogen and H₂O selectively.

2. The emission treatment system of claim 1, wherein the Cu-loaded non-zeolitic molecular sieve having a CHA crystal structure comprises Cu-SAPO-34.

3. The emission treatment system of claim 2, wherein the Cu-SAPO-34 contains a secondary metal.

4. The emission treatment system of claim 3, wherein the secondary metal comprises zirconium.

5. The emission treatment system of claim 2, wherein the Cu-SAPO-34 contains in the range of about 2 wt-% to 4 wt-% Cu.

6. The emission treatment system of claim 1, wherein the Cu-loaded non-zeolitic molecular sieve having a CHA crystal structure is combined with a metal containing zeolite SCR catalyst selected from Beta zeolite, zeolite Y, and ZSM-5.

7. The emission treatment system of claim 6, wherein the Cu-loaded non-zeolitic molecular sieve having a CHA crystal structure comprises Cu-SAPO-34.

8. The emission treatment system of claim 1, wherein the system comprises an ammonia-precursor injector including mixing station to mix air with aqueous urea and a valve.

9. The emission treatment system of claim 8, further comprising:
   a mixing station for mixing the aqueous urea with air; and
   a valve for metering precise amounts of aqueous urea.

10. The emission treatment system of claim 1, further comprising a second substrate interposed between the ammonia injector or ammonia-precursor injector and the SCR catalyst substrate.

11. The emission treatment system of claim 10, wherein the second substrate is coated with a SCR catalyst composition.

12. The emission treatment system of claim 10, wherein the second substrate is selected from a honeycomb flow through substrate, an open cell foam substrate, or a honeycomb wall flow substrate.

13. The emission treatment system of claim 1, further comprising an oxidation catalyst upstream of the ammonia injector or ammonia-precursor injector.

14. An emission treatment system for treatment of an exhaust gas stream comprising NOx and particulate matter, the emission treatment system comprising:
   a SCR catalyst substrate containing a catalyst comprising a Cu-loaded non-zeolitic molecular sieve having a CHA crystal structure and a Cu loading so that the catalyst is effective to selectively reduce nitrogen oxides with ammonia in the presence of oxygen in an exhaust gas stream at low temperature; and
   an ammonia injector or an ammonia-precursor injector positioned upstream of the SCR catalyst substrate for injecting ammonia or an ammonia-precursor, wherein the catalyst is effective to promote the reaction of ammonia with nitrogen oxides to form nitrogen and H₂O selectively.

\* \* \* \* \*